(12) United States Patent
Yip et al.

(10) Patent No.: US 8,721,025 B2
(45) Date of Patent: May 13, 2014

(54) METHOD OF MEASURING PRINTER SPATIAL CHARACTERISTICS

(75) Inventors: Ben Yip, Homebush West (AU); Kieran Gerard Larkin, Putney (AU); Peter Alleine Fletcher, Rozelle (AU)

(73) Assignee: Canon Kabushiki Kaisha, Tokyo (JP)

( * ) Notice: Subject to any disclaimer, the term of this patent is extended or adjusted under 35 U.S.C. 154(b) by 727 days.

(21) Appl. No.: 12/635,788

(22) Filed: Dec. 11, 2009

(65) Prior Publication Data
US 2010/0156987 A1    Jun. 24, 2010

(30) Foreign Application Priority Data
Dec. 18, 2008    (AU) ................................ 2008258213

(51) Int. Cl.
  *B41J 29/393*    (2006.01)
  *G01B 11/14*    (2006.01)

(52) U.S. Cl.
  USPC ............................................. 347/19; 356/625

(58) Field of Classification Search
  USPC ............................................. 347/19; 356/625
  See application file for complete search history.

(56) References Cited

U.S. PATENT DOCUMENTS

| | | | |
|---|---|---|---|
| 6,065,400 A | 5/2000 | Van Weverberg | |
| 6,685,297 B2 | 2/2004 | Butterfield et al. | |
| 6,940,618 B2 | 9/2005 | Kinas | |
| 7,073,883 B2 | 7/2006 | Billow | |
| 2002/0181986 A1* | 12/2002 | Castano et al. | 400/74 |
| 2004/0041863 A1* | 3/2004 | Ioka et al. | 347/10 |
| 2005/0099439 A1 | 5/2005 | Folkins | |
| 2006/0119633 A1 | 6/2006 | Hsu et al. | |
| 2008/0018701 A1 | 1/2008 | Lee | |
| 2009/0021551 A1 | 1/2009 | Fletcher et al. | |

FOREIGN PATENT DOCUMENTS

JP    2007-216539 A    8/2007

OTHER PUBLICATIONS

Examiner's Report in Australian Patent Appln. No. 2008258213 dated Dec. 15, 2010.

* cited by examiner

*Primary Examiner* — Uyen Chau N Le
*Assistant Examiner* — Kajli Prince
(74) *Attorney, Agent, or Firm* — Fitzpatrick, Cella, Harper & Scinto

(57) ABSTRACT

Methods, apparatuses, systems and computer program products for measuring spatial characteristics of an inkjet printer are disclosed. Group of marks of a first predetermined pattern are printed on a print medium using a first group of nozzles. Groups of marks of a second predetermined pattern are printed using a second group of nozzles. A region of overlap of the printed groups of marks is formed. At least a portion of the print medium having printed groups of marks is imaged. From the region of overlap, first and second groups of marks from the first and second printed patterns are selected. For each group of marks, a position representative of that group is determined. An offset for measuring spatial characteristics of the printer between the first and second printed patterns is determined dependent upon the representative position of each of the first and second groups of marks.

17 Claims, 28 Drawing Sheets

METHOD OF MEASURING PRINTER SPATIAL CHARACTERISTICS

RELATED APPLICATION

The present application claims under 35 USC 119 the benefit of the filing date of Australian Patent Application No. 2008258213 filed on 18 Dec. 2008, of which the entire contents are hereby incorporated by reference.

TECHNICAL FIELD

The present invention relates generally to printers and in particular to printer calibration.

BACKGROUND

In recent years, high quality colour printers have become a norm. Two significant and related factors led to this norm, namely improvements in accuracy in colour reproduction and improvements in resolution. For ink jet printers, typical resolutions are 1200 dpi or higher, which translates into a printer ink dot size (and separation) of 20 microns or less. In many systems, the ink jet printer may overprint regions multiple times to help minimise the effect of printer defects, such as blocked printer head nozzles. The optical density of a printed colour can be sensitive to the precise value of the displacement between overprinted regions. This means that (for high quality at least) the exact displacement of the printer head between overprints must be controlled or calibrated.

A number of approaches have been proposed for calibrating the movements of the printer head relative to the medium being printed on in a precise manner. Several principal approaches can be summarised as follows:
- Measure (using the human eye, or more recently an optical sensor) optical density of an overlapping, interlaced dot pattern (also known as complementary dot patterns);
- Measure alignment of a series of lines (visually inspection using the Vernier effect);
- Measure alignment of an interlaced series of lines (Vernier effect using optical sensor); and
- Measure (using a scanner) individual positions of sparse, but regular arrays of dots.

Until recently the visually based methods have dominated so that visual inspection is assumed and is not usually mentioned explicitly. Recent automatic methods are typically just modifications of the visual methods to allow simple optical sensors to monitor spatial variations in optical density. Measurement of individual dot positions, although fundamental, is quite unreliable due to the large variations in dot shape, position and size. There is also the difficulty of unambiguously locating isolated dots in large regions on the medium being printed upon.

SUMMARY

In accordance with an aspect of the invention, there is provided a method of measuring spatial characteristics of an inkjet printer. The method comprises the steps of: printing groups of marks in accordance with a first predetermined pattern on a print medium using a first group of nozzles of a print mechanism of the printer; printing groups of marks in accordance with a second predetermined pattern on the print medium using a second group of nozzles of the print mechanism of the printer, a region of overlap of the printed groups of marks in accordance with the first and second printed patterns being formed on the print medium; imaging at least a portion of the print medium having the groups of marks printed thereon; selecting from the image of the print medium in the region of overlap a first group of marks from the first printed pattern and a second group of marks from the second printed pattern; for each of the first and second group of marks, determining a position representative of that group printed on the print medium; and determining an offset for measuring spatial characteristics of the printer between the first and second printed patterns dependent upon the representative position of each of the first and second group of marks.

The first predetermined patterns may be identical or substantially identical.

The first predetermined pattern may be printed on the print medium before a line feed of the print medium by the printer, and the second pattern may be printed on the print medium after the line feed of the print medium by the printer. Alternatively, the first predetermined pattern and the second predetermined pattern may be printed on the print medium by different colour nozzle banks of the printer. The first predetermined pattern and the second predetermined pattern may be printed on the print medium by different swath direction of the printer.

The first pattern, or the second pattern, or both, may be a spread spectrum pattern.

The imaging may have a low imaging resolution.

The first group of may be is distinguishable from the second group of marks independently of the identification of any one mark.

The method may further comprise the step of measuring the spatial characteristics of the printer.

The printed groups of marks in the first and second patterns may form a test chart. The image may be a digital image of the printed test chart. The offset may be a displacement between patterns in the test chart and the image of the printed test chart. The method may further comprise the steps of: aligning the test chart and the image of the printed test chart; and extracting a region of the test chart from the aligned scanned image. The method may further comprise the step of measuring the spatial characteristics of the printer. The spatial characteristics of the printer may comprise a line feed distance, the line feed distance dependent upon a shift between the groups of marks of the first predetermined pattern in the test chart and the groups of marks of the first predetermined pattern in a selected region of the image of the printed test chart and upon a shift between the groups of marks of the second predetermined pattern in the test chart and the groups of marks of the second predetermined pattern in a selected region of the image of the printed test chart, the selected region being in the region of overlap.

The spatial characteristics of the printer may comprise the alignment of different colour nozzle banks of the printer. The spatial characteristics of the printer may comprise the horizontal alignment of bidirectional printing.

More than two groups of marks may be printed and imaged.

In accordance with another aspect of the invention, there is provided an apparatus for measuring spatial characteristics of an inkjet printer. The apparatus comprises: a memory for storing data and instructions for a processor unit; and a processor unit coupled to the memory and the interface, the processor unit performing the method of measuring spatial characteristics of an inkjet printer according to the foregoing aspect of the invention dependent upon the instructions and the data.

In accordance with another aspect of the invention, there is provided a system for measuring spatial characteristics of an inkjet printer. The system comprises: the apparatus according to the foregoing aspect; an inkjet printer coupled to the apparatus for printing the test chart; and an imaging device coupled to the apparatus for imaging the printed test chart. The imaging device may be a scanner.

In accordance with another aspect of the invention, there is provided a computer program product comprising a tangible computer readable medium having a computer program recorded for execution by a computer system to perform the method of measuring spatial characteristics of an inkjet printer according to the foregoing aspects of the invention, the computer program comprising computer program code means for implementing the steps of the method.

Other aspects of the invention are also disclosed.

BRIEF DESCRIPTION OF THE DRAWINGS

Embodiments of the present invention are described hereinafter with reference to the drawings, in which.

DETAILED DESCRIPTION

Figure 1:
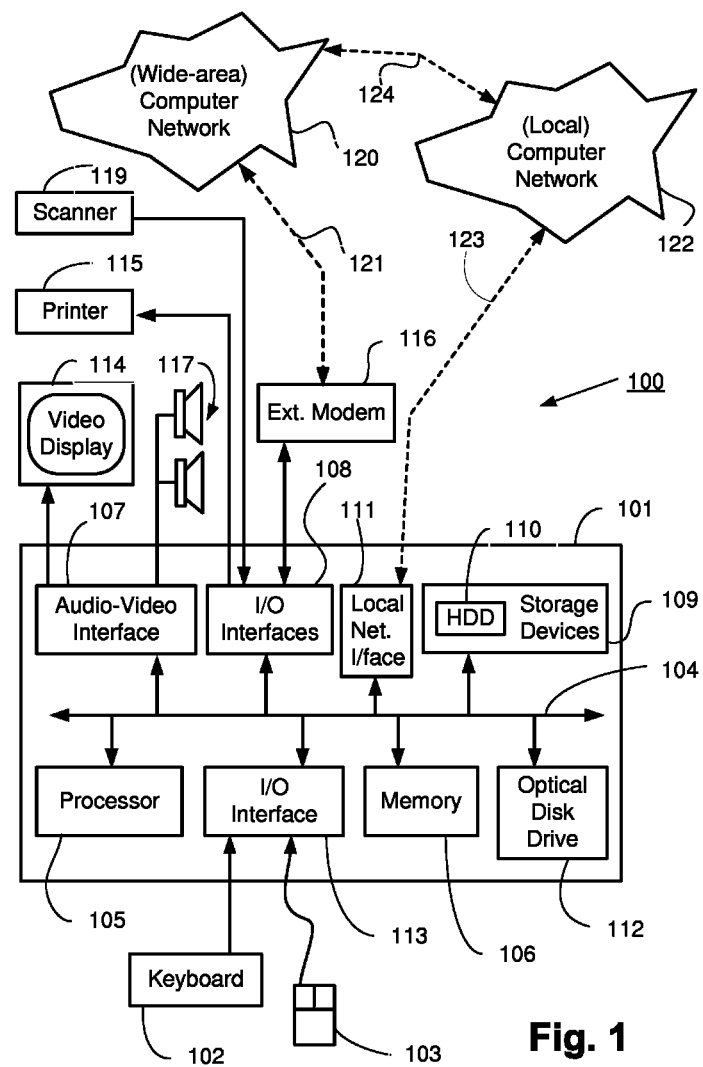
FIG. 1 is a schematic block diagram of a general-purpose computer, on which the embodiments of the invention may be practised.

Methods, apparatuses, systems, and computer program products for measuring spatial characteristics of an inkjet printer are disclosed. In the following description, numerous specific details, including particular printer configurations, dot pattern resolutions, print head configurations, and the like are set forth. However, from this disclosure, it will be apparent to those skilled in the art that modifications and/or substitutions may be made without departing from the scope and spirit of the invention. In other circumstances, specific details may be omitted so as not to obscure the invention.

Where reference is made in any one or more of the accompanying drawings to steps and/or features, which have the same reference numerals, those steps and/or features have for the purposes of this description the same function(s) or operation(s), unless the contrary intention appears.

Methods are described of measuring the spatial characteristics of an inkjet printer using relative position estimation of printed noise patches (or regions). Also described is the design of such patches to enable accurate estimates based on cross-correlation.

Processing Environment

Methods of measuring spatial characteristics of an inkjet printer in accordance with embodiments of the invention may be implemented using a computer system 100, such as that shown in FIG. 1. The methods may be implemented as software, such as one or more application programs executable within the computer system 100. In particular, the steps of the methods of measuring spatial printer characteristics are effected by instructions in the software that are carried out within the computer system 100. The instructions may be formed as one or more code modules, each for performing one or more particular tasks. The software may also be divided into two separate parts, in which a first part and the corresponding code modules performs the measurement of the spatial printer characteristics and a second part and the corresponding code modules manage a user interface between the first part and the user. The software may be stored in a computer readable medium, including the storage devices described below, for example. The software is loaded into the computer system 100 from the computer readable medium, and then executed by the computer system 100. A computer readable medium having such software or computer program recorded on it is a computer program product. The use of the computer program product in the computer system 100 effects an advantageous apparatus for image processing, particularly for the measurement of spatial printer characteristics of an inkjet printer.

As shown in FIG. 1, the computer system 100 comprises a computer module 101, input devices such as a keyboard 102, a mouse pointer device 103, and a scanner 119, and output devices including a printer 115, a display device 114, and loudspeakers 117. An external Modulator-Demodulator (Modem) transceiver device 116 may be used by the computer module 101 for communicating to and from a communications network 120 via a connection 121. The network 120 may be a wide-area network (WAN), such as the Internet or a private WAN. If the connection 121 is a telephone line, the modem 116 may be a traditional "dial-up" modem. Alternatively, if the connection 121 is a high capacity (eg: cable) connection, the modem 116 may be a broadband modem. A wireless modem may also be used for wireless connection to the network 120.

The computer module 101 typically includes at least one processor unit 105, and a memory unit 106 for example formed from semiconductor random access memory (RAM) and read only memory (ROM). The module 101 also includes an number of input/output (I/O) interfaces including an audio-video interface 107 that couples to the video display 114 and loudspeakers 117, an I/O interface 113 for the keyboard 102 and mouse 103 and optionally a joystick (not illustrated), and an interface 108 for the external modem 116, scanner 119 and printer 115. In some implementations, the modem 116 may be incorporated within the computer module 101, for example within the interface 108. The computer module 101 also has a local network interface 111 which, via a connection 123, permits coupling of the computer system 100 to a local computer network 122, known as a Local Area Network (LAN). As also illustrated, the local network 122 may also couple to the wide-area network 120 via a connection 124, which would typically include a so-called "firewall" device or similar functionality. The interface 111 may be formed by an Ethernet™ circuit card, a wireless Bluetooth™ or an IEEE 802.11 wireless arrangement. The networks 120 and 122 may represent sources of image data, and image data may also be sourced from the scanner 119. The scanner 119 may be a flatbed scanner for scanning documents.

The interfaces 108 and 113 may afford both serial and parallel connectivity, the former typically being implemented according to the Universal Serial Bus (USB) standards and having corresponding USB connectors (not illustrated). Storage devices 109 are provided and typically include a hard disk drive (HDD) 110. Other devices such as a floppy disk drive and a magnetic tape drive (not illustrated) may also be used. An optical disk drive 112 is typically provided to act as a non-volatile source of data. Portable memory devices, such optical disks (eg: CD-ROM, DVD), USB-RAM, and floppy disks for example may then be used as appropriate sources of data to the system 100.

The components 105, to 113 of the computer module 101 typically communicate via an interconnected bus 104 and in a manner which results in a conventional mode of operation of the computer system 100 known to those skilled in the relevant art. Examples of computers on which the described arrangements can be practised include IBM-PC's and compatibles, Sun Sparcstations, Apple Mac or a like computer systems evolved therefrom.

Typically, the application programs discussed above are resident on the hard disk drive 110 and read and controlled in execution by the processor 105. Intermediate storage of such programs and any data, such as image data, fetched from the networks 120 and 122 or scanner 119 may be accomplished using the semiconductor memory 106, possibly in concert with the hard disk drive 110. In some instances, the application programs may be supplied to the user encoded on one or more CD-ROM and read via the corresponding drive 112, or alternatively may be read by the user from the networks 120 or 122. Still further, the software can also be loaded into the computer system 100 from other computer readable media. Computer readable media refers to any storage medium that participates in providing instructions and/or data to the computer system 100 for execution and/or processing. Examples of such tangible media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 101. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 114. Through manipulation of the keyboard 102 and the mouse 103, a user of the computer system 100 and the application may manipulate the interface to provide controlling commands and/or input to the applications associated with the GUI(s).

The methods of measuring spatial characteristics of an inkjet printer may also be implemented, at least in part, in dedicated hardware such as one or more integrated circuits performing the functions or sub functions to be described. Such dedicated hardware may include graphic processors, digital signal processors, or one or more microprocessors and associated memories.

Inkjet Printer and Print Head

Figure 2:
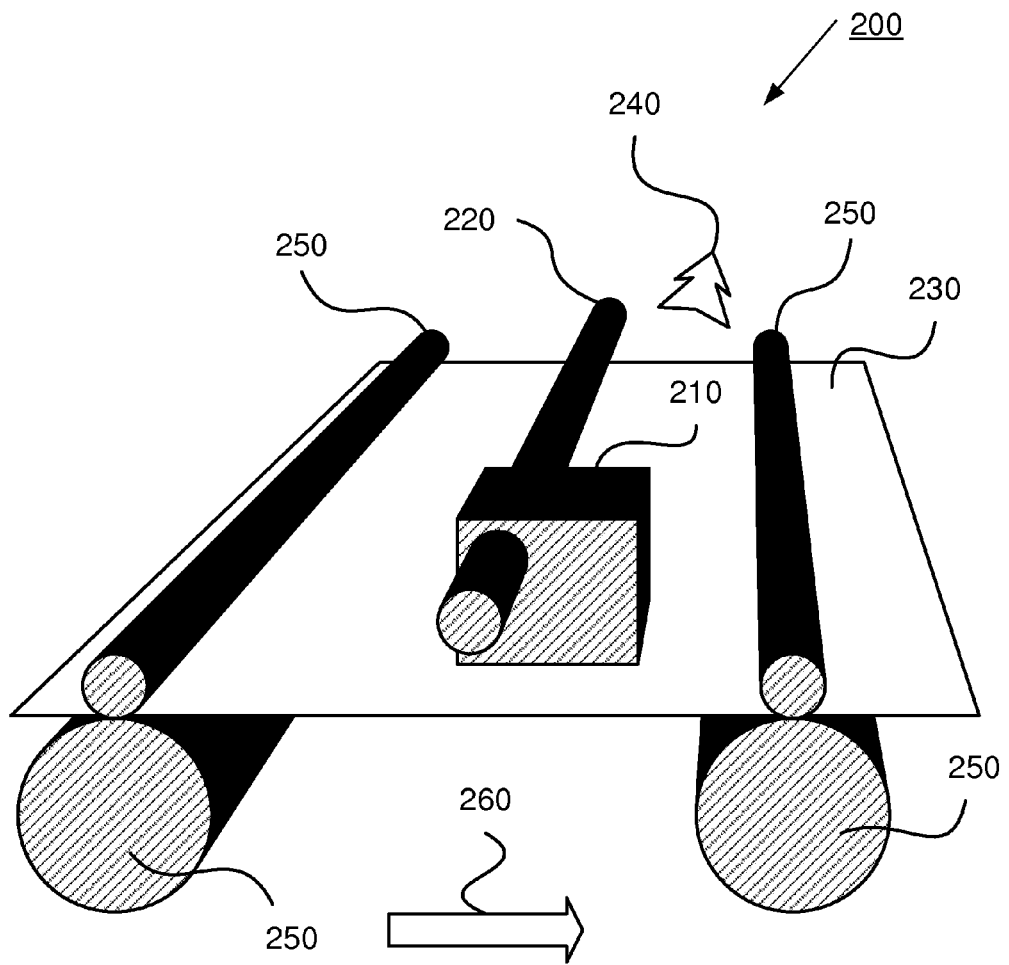
FIG. 2 is a block diagram illustrating a simplified representation of the mechanical layout of an inkjet printer with a moving printing head.

FIG. 2 illustrates a simplified representation of the internal arrangement of an inkjet printer 200. The arrangement 200 comprises a print mechanism comprising a print head 210 having ink ejection nozzles (not illustrated) organised into groups based on colour and/or ink volume. In some configurations, the print mechanism may incorporate more than one print head. The print head 210 is mounted on a carriage 220, which transverses a print medium 230, and forms image swaths during a forward passage in a scan direction 240 and a back passage opposite to the scan direction 240, by controlling the ejection of ink from the ink ejection nozzles within the nozzle banks. The inkjet printer 200 further comprises a print medium advance mechanism 250, which transports the print medium 230 in a direction 260 perpendicular to the print head scan direction 240. The print medium 230 passes through opposing rollers of the mechanism 250. The distance of the print medium advance is called the line feed distance.

Figure 3:
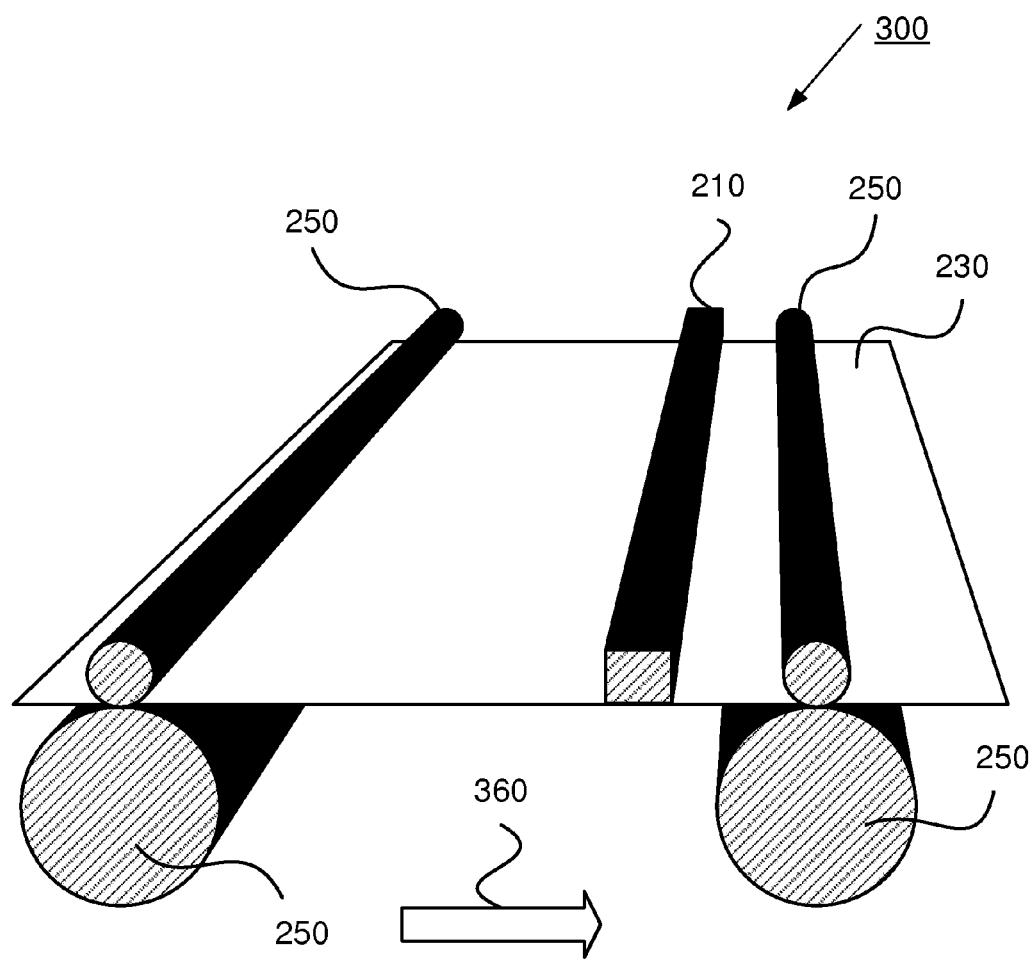
FIG. 3 is a block diagram illustrating a simplified representation of the mechanical layout of an inkjet printer with a full-width, fixed printing head.

FIG. 3 illustrates a simplified representation of the internal arrangement of a full-width fixed head printer 300. The arrangement 300 comprises a print head 210 having ink ejection nozzles (not illustrated) organised into groups based on colour and/or ink volume. The print head 210 is stationary and forms an image by controlling the ejection of ink from the ink ejection nozzles within the nozzle banks while the print medium advance mechanism 250 transports the print medium 230 in the print medium advance direction 360. The distance of the print medium advance is called the line feed distance.

The mechanism of the inkjet printers 200, 300 shown in FIGS. 2 and 3 is essentially the same, and the embodiments of the invention can be applied to both types of inkjet printers 200, 300. The embodiments described hereinafter are directed to the inkjet printer in FIG. 2. However, in the light of this disclosure, the same can be readily applied to the printer 300 of FIG. 3.

Figure 4:
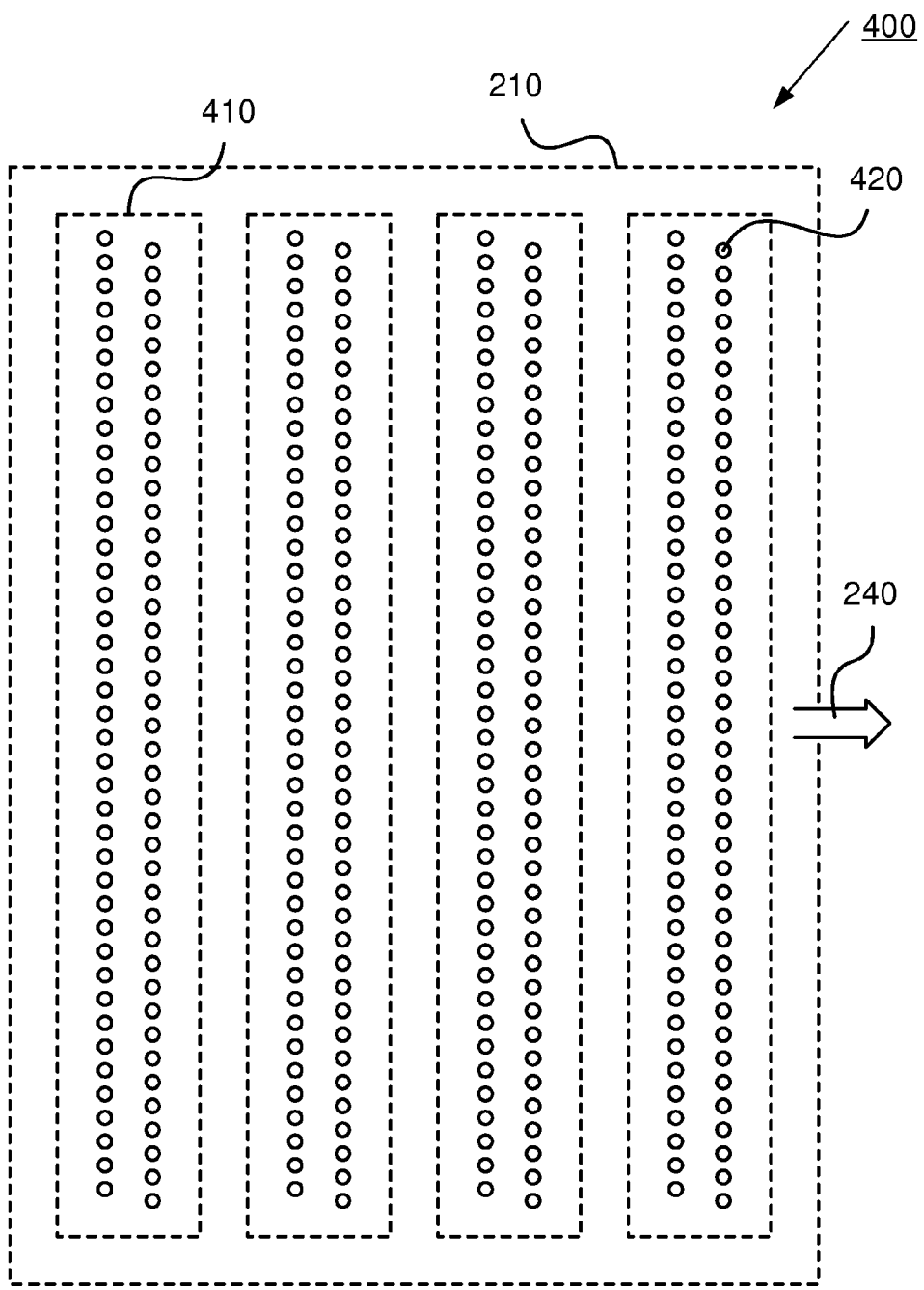
FIG. 4 is a block diagram illustrating a typical layout of ink ejection nozzles of an inkjet print head.

FIG. 4 illustrates a typical layout 400 of the ink eject nozzle banks 410 of the print head 210. Each nozzle bank 410 comprises multiple ink ejection nozzles 420. For an inkjet printer to produce images that do not contain noticeable visual artefacts, alignment is required between the nozzle banks 410 used within the same passage and between the nozzle banks 410 used during the forward and backward passages, respectively. The print medium advance mechanism 250 must also be calibrated to advance the print medium 230 to correctly align swaths. The print head scan direction 240 is shown.

To produce optimal image quality, each individual printing system must be characterised, and components of that printing system must be calibrated accordingly.

Imaging System

Figure 5:
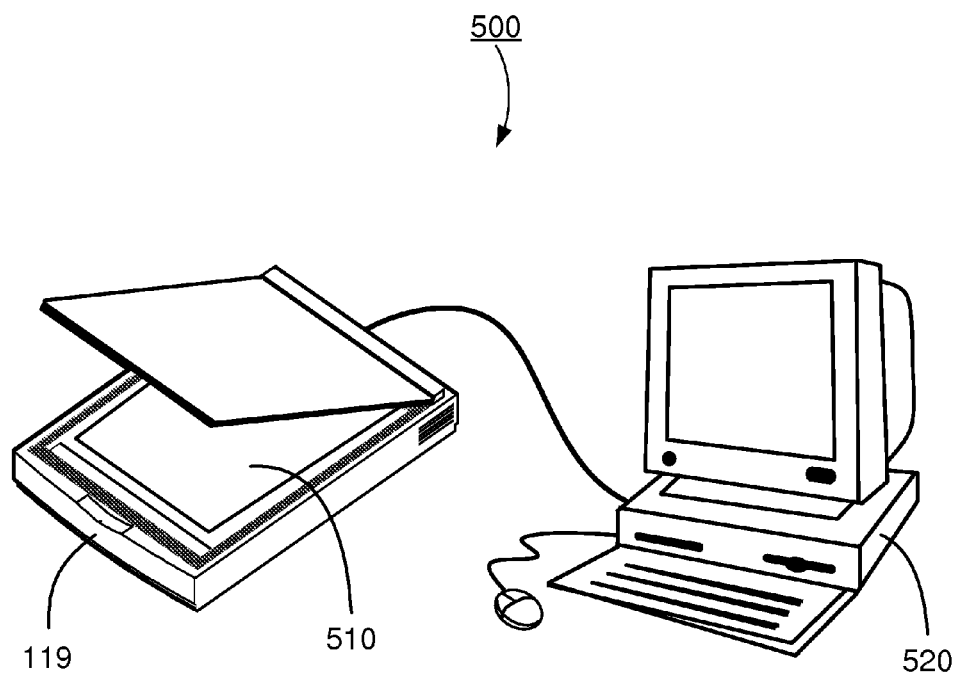
FIG. 5 is a block diagram illustrating a measurement system that comprises a flat bed scanner attached to a computer.

FIG. 5 shows a measurement system 500 for determining a two-dimensional position of a location on a surface 510 imaged by the system 500. The measurement system 500 comprises a flat bed scanner 119 attached to a computer 520. The scanner 119 can output a scanned digital image to the computer 520 (100 in FIG. 1).

System Overview

Figure 7:
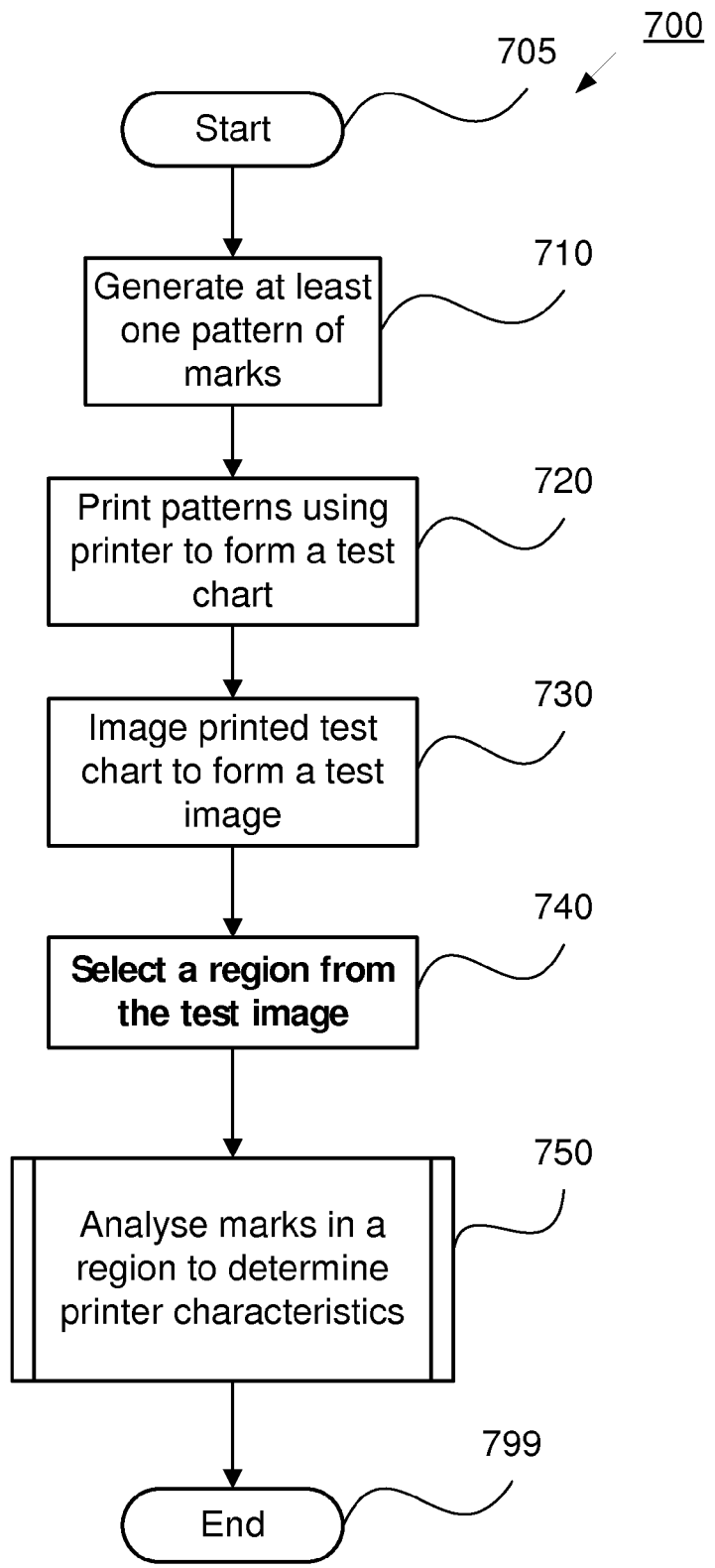
FIG. 7 is a flowchart illustrating overall a method of determining printer characteristics in accordance with the embodiments of the invention.

FIG. 7 illustrates common steps of a generalised method 700 of determining printer characteristics in accordance with the embodiments, which can be implemented in the measurement system 500 illustrated in FIG. 5. The method 700 measures printer characteristics of a to-be-analysed printer.

The method 700 commences at step 705. In step 710, one or more predetermined patterns of marks, such as dots, are generated in the computer 520 using the processor 105. The patterns can be stored in memory 106. The mark patterns can vary to suit different measurement purposes in different embodiments. In step 720, the mark (dot) patterns are printed on a print medium using the inkjet printer to form a test pattern. This is done using the to-be-analysed printers in a manner that the to-be-measured printer characteristic is involved in the printing process. In step 730, the printed test chart is imaged by a scanner 119 or other imaging devices and forms a test image. The scanner 119 or other imaging devices can operate at a resolution lower, higher or equal to that of the printer 200, above a lower limit which can be determined empirically. The scanned image of the printed test image is stored in the memory 106 of the computer 520 for further processing. In step 740, a region from the test image is selected using the processor 105. This is done using a program that resides in the computer 520. The dimension of the selected region may vary to suit different measurement purposes in different embodiments, as described hereinafter. In step 750, the marks in the selected region of the test image are analysed to determine the printer characteristics. This is done by a program residing in the computer 520 using the processor 105, and the computer executing the program outputs the measurements of the printer characteristics. The measurements may be stored in the memory 106 of the computer. The method 700 ends at step 799.

First Embodiment

In accordance with a first embodiment of this invention, the linefeed distance of a printer is measured in cases where the linefeed distance is of a suitable size to match to the dot patterns. This typically occurs when the linefeed is less than half the width of the print head 210 and more than a lower limit empirically determined based on the resolution of the printer and the quality of the scanner 119. For example, suppose the line feed is nominally 144/1200 of an inch (equivalent 144 pixels at 1200 dpi) and the head is 512/1200 of an inch. This would be an appropriate scenario in which to use the first embodiment.

In step 710 of FIG. 7, dot patterns are generated. In this embodiment, two dot patterns are used.

Dot Pattern Design

A dot pattern is a two-dimensional binary image presenting the layout of dots. A pixel in a dot pattern having a value of 1 means there is a dot to be printed, and a pixel that has a value of zero means there is no dot to be printed. When a dot pattern is being printed, a pixel in a dot pattern of value 1 means an ink is dropped at that position from the printer. Throughout the description of the embodiments, the representation of this dot pattern in a frequency domain is used, and this dot pattern has both wide spatial and wide spectral support. In this first embodiment of the invention, the dot pattern is randomly generated. Let D denote the dot density of the dot pattern, where D ranges from zero (0), where no pixels have a dot, to one (1), where all pixels are dots. For each pixel in a dot pattern, a pixel has the value 0 if $R<(1-D)$, and has the value 1 if $R>=(1-D)$, where R is a random-generated real number between 0 and 1. The pattern may be modified to suit hardware constraints—for example, such that no two dots are adjacent. In this embodiment, the density D equals 0.05.

Figure 8:
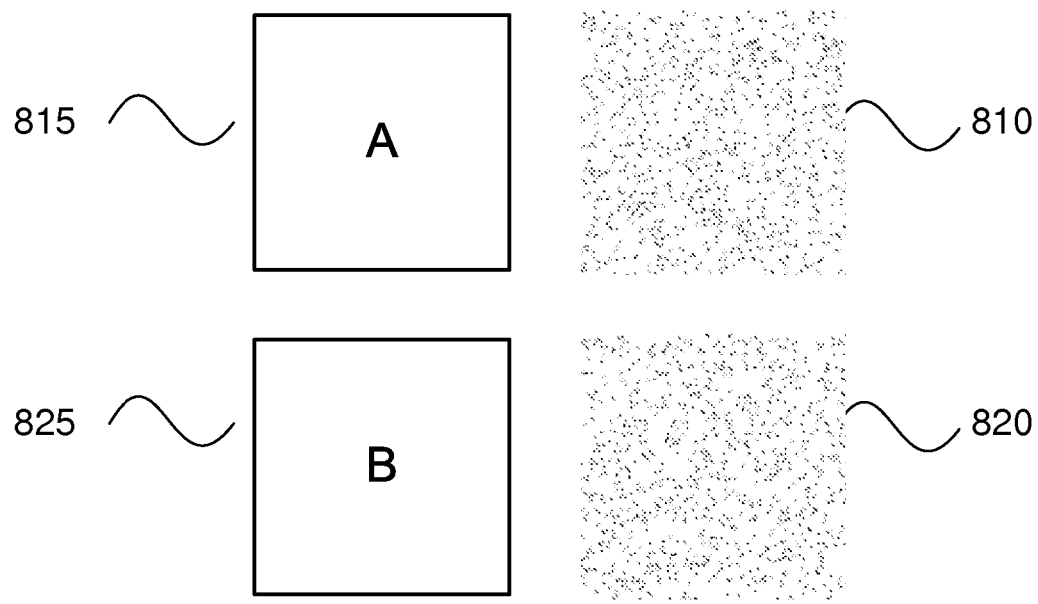
FIG. 8 is an image of example dot patterns at a resolution of 144×144 pixels for use in a test chart.

Example dot patterns 810, 820 are displayed in FIG. 8. Each dot pattern 810, 820 is 144 pixels wide and high. For the ease of illustration and understanding, the dot patterns 810, 820 are depicted with blocks as patterns "A" 815 and "B" 825 in FIG. 8.

Print the Dot Patterns

Referring to FIG. 7, after the step 710 of generating the dot patterns, the next step 720 is to print the dot patterns "A" 815 and "B" 825 to form a test chart in accordance with the first embodiment of the invention. While the abstractions 815 and 825 are depicted and referred to for ease of description and illustration, it will be understood that what is actually printed is the patterns 810 and 820, respectively. The dot patterns are printed by the print mechanism of the printer. The print mechanism, as discussed above, comprises one or more print heads with inkjet nozzles. In this embodiment, the process of printing the test chart corresponds to the method 1300 in FIG. 13.

Figure 9:
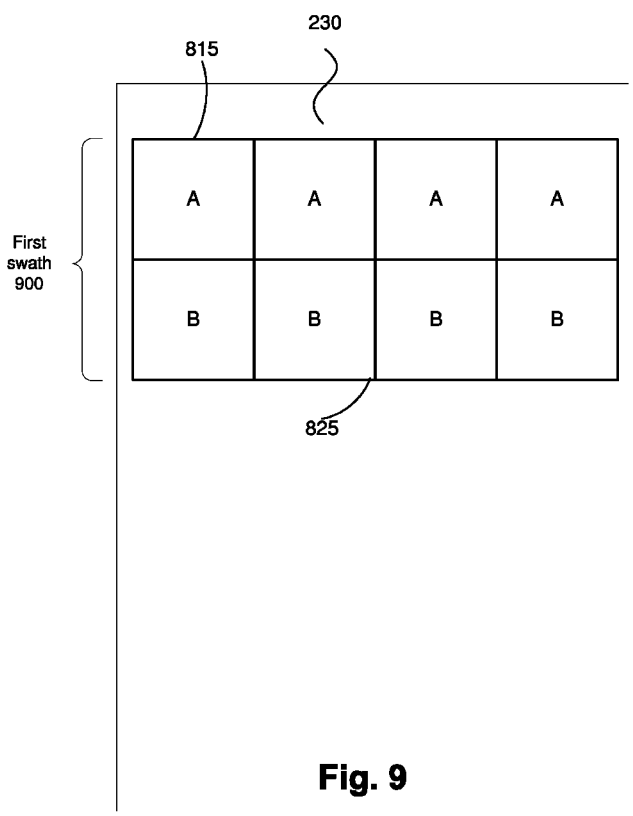
FIG. 9 is a block diagram showing an abstraction of a print medium after one swath of two dot patterns A and B is printed by an inkjet printer in accordance with a first embodiment of the invention.

FIG. 9 illustrates an abstraction of the test chart after one swath 900 of patterns "A" 815 and "B" 825 are printed by the inkjet printer in accordance with the first embodiment of the invention. Since the dot pattern is smaller than half the width of the print head, two different patterns "A" 815 and "B" 825 can be printed adjacently, pattern "A" above pattern "B" in this example. These patterns 815, 825 are printed repeatedly to the width of the page 230. After a first swath 900 is printed, the print medium 230 is expected to be advanced by the line feed distance, for example, 144 dot distances at 1200 dpi, and this embodiment measures the actual line feed distance that occurred.

Figure 10:
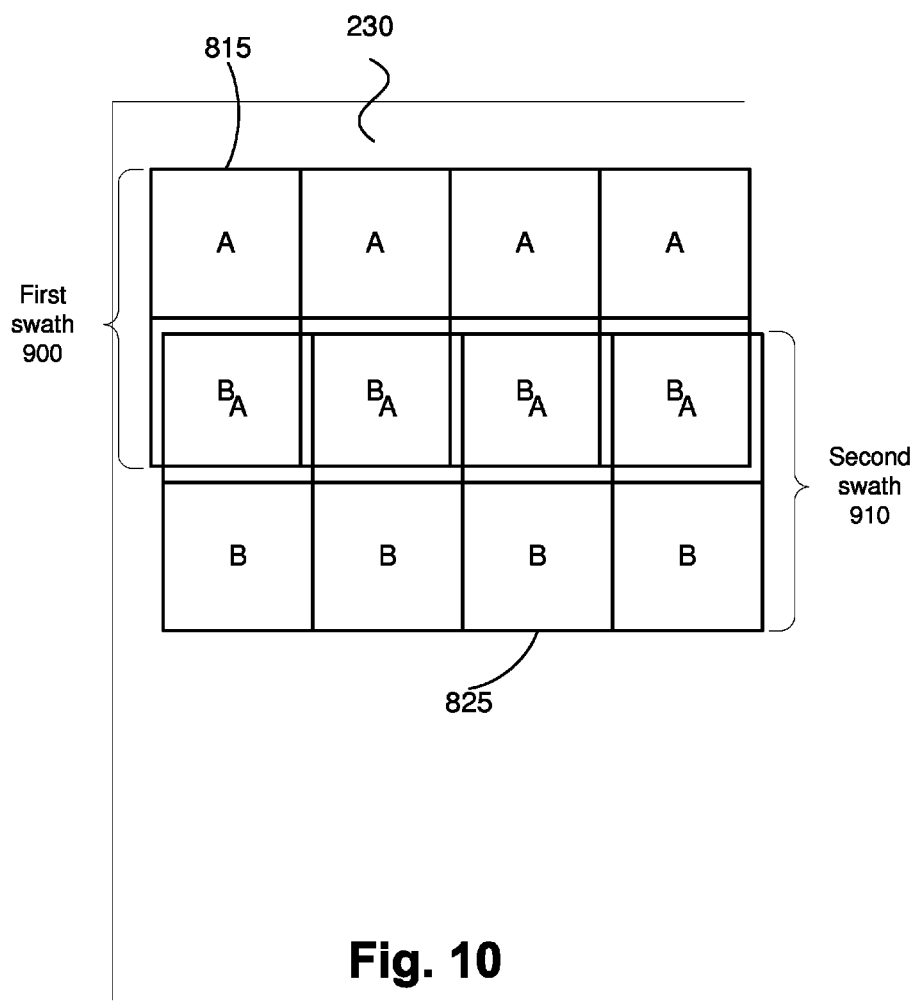
FIG. 10 is a block diagram showing an abstraction of the print medium of FIG. 9 after two swaths are printed by the inkjet printer in the first embodiment, where the printed swaths are overlapping.

Once the print medium 230 is advanced, another group of dot patterns is printed similarly in a second swath 910, partially overlapping the first swath 900, with the resulting test chart shown in FIG. 10. Since the dot patterns are size matched to the expected line feed, the second pattern 825 of the first swath 900 is ideally exactly overlayed by the first pattern 815 of the second swath 910 and is largely overlapping in any case (note the slight offset vertically and horizontally in FIG. 10).

Figure 11:
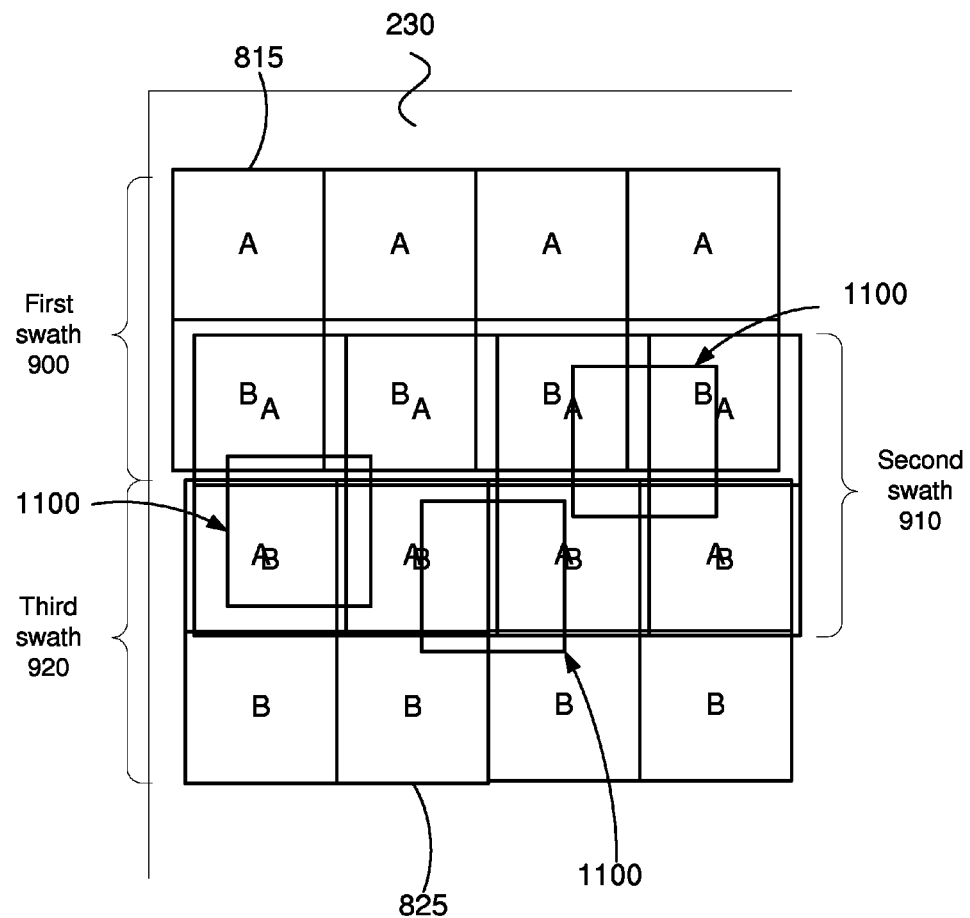
FIG. 11 is a block diagram showing an abstraction of the print medium of FIGS. 9 and 10 after three swaths are printed in the first embodiment, where the swaths are overlapping.

The process of advancing the print medium 230 and printing another swath 920 is repeated until the chart is the desired length. In FIG. 11, this is limited to three swaths 910, 920, 930 for clarity.

Figure 12:
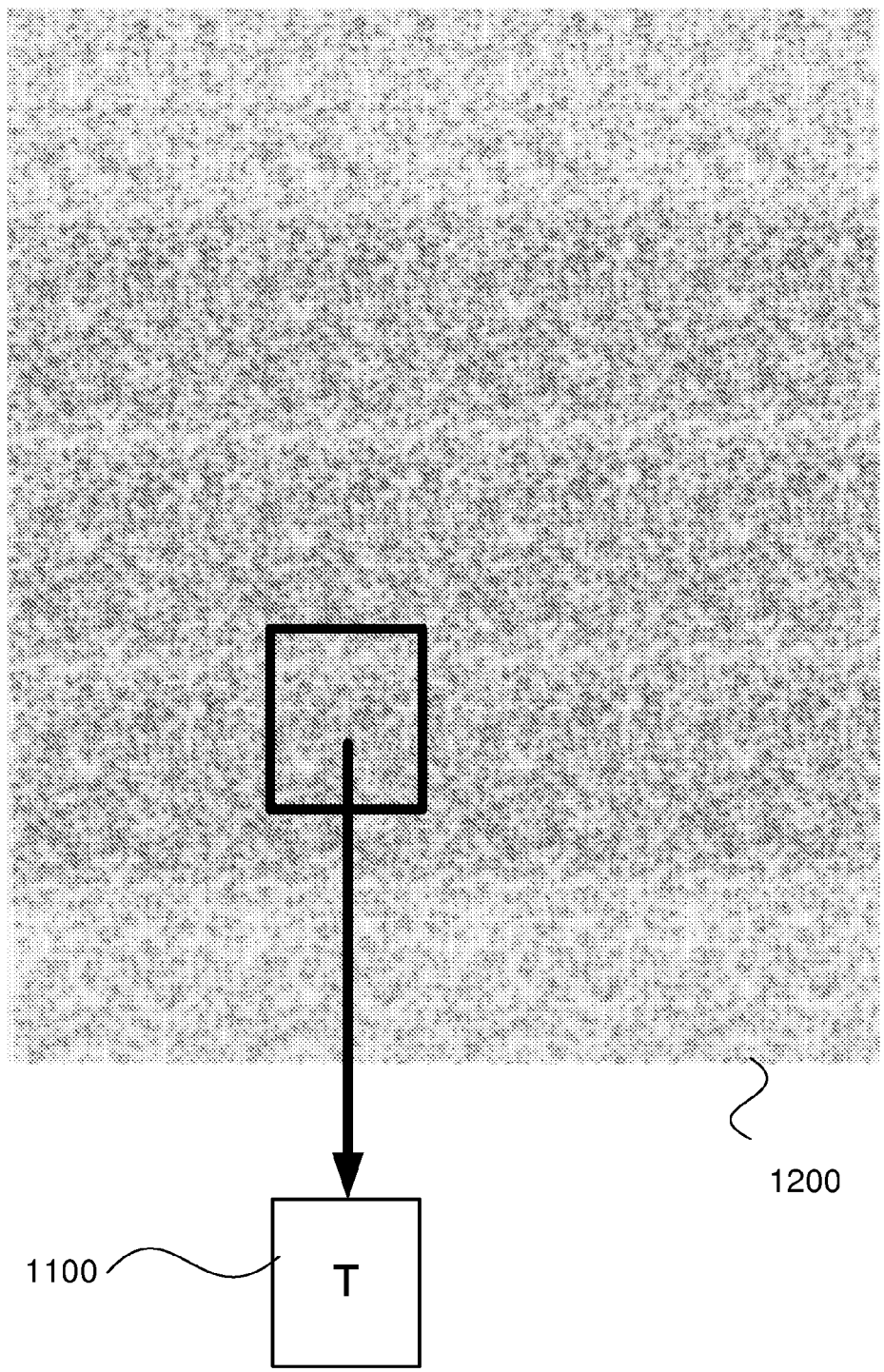
FIG. 12 is an image showing the print medium after a number of swaths have been printed on the print medium of FIG. 9 and a selected region T.

After the test chart is printed, the printed test chart is then imaged as in step 730 in FIG. 7. The printed test chart 1200 is placed on the scanner 119 and scanned to the memory of computer 520 to form the test image 1200 shown in FIG. 12. From this test image 1200, a region "T" 1100 is extracted 1302 for analysis (three example regions 1100 are illustrated in FIG. 11). This region 1100 must contain sufficient signal from both of the dot patterns 810 and 820, ideally in the overlapping region of the chart (in the embodiment, anywhere except the top or bottom dot patterns—for example, 144/1200 of an inch) and, as such, contain a number of dots from 810 and 820. The region does not need to be entirely within or aligned with any particular pattern. The location of any representative point within the region within the scan is known.

Referring to FIG. 7, after the step 740 of selecting the region "T" 1100 from the test image, the next step 740 is to analyse the region "T" 1100. Referring back to FIG. 13, the next step 1304, in analysing the selected region "T" 1100, is to find the shift between the pattern A 815 and the selected region T 1100. The result is denoted by a vector (Ax, Ay) 1308. Also, in step 1306, the shift between the dot pattern B 825 and the selected region T 1100 is analysed. The result is denoted by a vector (Bx, By) 1310.

The term "find the shift between A and T", also known as "find the offset between A and T", refers to finding the vector displacement of the signals from dot pattern A 815 within the region T 1100. For example, if the region T 1100 is coincidently selected such that the signal from the dot pattern A 815 is located at the centre of the selected region T 1100, the shift vector is (0, 0). For example, a shift vector of (2.7, −1.3) means the dot pattern A 815 is offset from the centre of the selected region T 1100 by 2.7 pixels in the x direction and −1.3 pixels in the y direction.

There are many methods to find the shift known in the art. One method involves iteratively simulating the dot patterns with different shift properties until a dot pattern matches the test image. Another method for determining the offset between any representative point in the dot pattern A 815 and the corresponding representative point in the selected region T 1100 is by correlation, which is described hereinafter.

Figure 6:
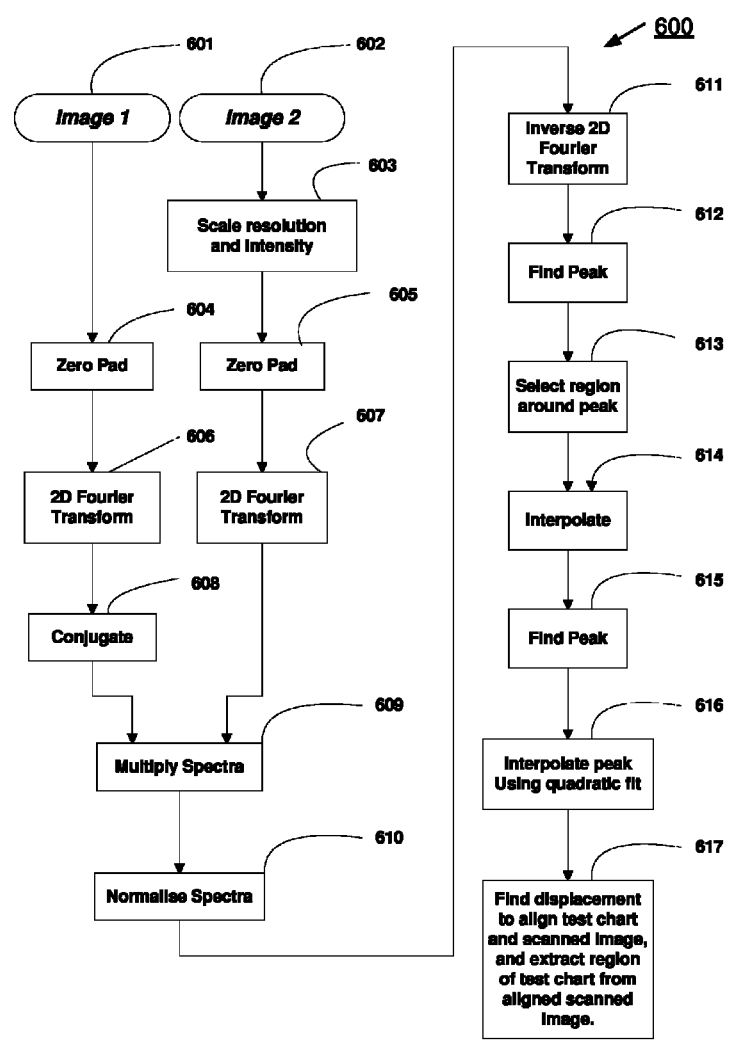
FIG. 6 is a schematic flow diagram illustrating a method of aligning a scanned image with its digital test chart and extracting a region of a test chart from the aligned scanned image.

FIG. 6 shows a schematic flow diagram of a method 600 of finding the displacement (offset) between two images. The method 600 starts by taking two images 601 and 602 as input. The image 601 may be the original test chart and the image 602 may be the scanned image of the printed test chart. Step 603 ensures both images 601, 602 have the same resolution scale and intensity range. In particular, the resolution and intensity of image 602 are scaled. Both the images 601, 602 are made to have the same width and same height by padding white in one or both dimensions in steps 604 and 605, respectively. The rest of the alignment process operates on two equal sized images 604 and 605 and calculates a high resolution displacement in 617 between the features within the two patch images. More particularly, the displacement in step 617 is a vector offset from the image 604 to the image 605. The image 605 is aligned to the image 604 according to the displacement and images of the test chart are extracted 617 from the aligned image 605. The process relies on the two images containing similar image data that may be at different spatial positions within their respective image regions.

Padding 604, 605 also reduces aliasing artefacts in the subsequent processing stages. The padding size may be chosen such that the resultant padded image region is a size suitable for a computationally efficient implementation of the subsequent 2D Fourier transform.

Next, a 2-dimensional Fourier Transform is applied 606, 607 to the padded images respectively to form spectra. Both spectra 606 and 607 are two dimensional, complex valued arrays. A conjugated spectrum 608 is formed from spectrum 606 by negating the imaginary part of spectrum 606.

The two complex spectra 608 and 607 are then combined by multiplying the arrays on an element by element basis to form a correlation spectrum 609. The correlation spectrum 609 is further processed where the amplitudes of the complex valued correlation spectrum 609 are unitised to form a normalised phase correlation spectrum 610.

A 2-dimensional Inverse Fourier Transform is then applied in step 611 to the normalised correlation spectrum 610 to form a correlation amplitude image.

The largest absolute amplitude value in the correlation amplitude image 611 is found in step 612. The offset from the image centre of this largest amplitude value gives a coarse peak position 612, measured in whole image pixels.

An image region, known as the peak region image, is selected 613 from the correlation amplitude image 611 in the vicinity of the coarse peak position. This peak image region 613 can be smaller than the correlation amplitude image 611 to reduce the computational requirements of the subsequent processing stages.

The peak region image 613 is interpolated in step 614 in both dimensions by an integer factor using up-sampling and linear filtering. The peak is found in step 615 in the up-sampled image 614. The interpolation allows the position of the peak to be determined with sub-pixel resolution.

Further improvement to the accuracy of the peak position determination is performed in step 616 by interpolation of the peak using quadratic polynomials. The quadratic interpolation is performed by fitting a quadratic polynomial to the image elements in the immediate vicinity of the peak, using least squares error criteria. The quadratic is then solved analytically to obtain the position of the peak. The resultant displacement obtained has an accuracy that is significantly greater than the resolution of the original patch images 601 and 602 and the interpolated correlation image. Then, the region of the test chart is extracted from the aligned scanned image according to the obtained displacement result 617.

To find the shift between the dot pattern A 815 and the selected region T 1100, the steps in FIG. 6 can be applied by setting 601 to pattern "A" 815 and image 602 to region "T" 1100. The displacement result 617 is the shift vector (Ax, Ay) 1308 in FIG. 13, which defines the offset of any representative point in A to the corresponding representative point in T. The shift vector (Bx, By) 1310 between the dot pattern B and the selected region T 1100 is also found by similarly applying the steps in FIG. 6.

One further technique, known in the art, to refine the accuracy of the vectors (Ax, Ay) and (Bx, By) is by iteratively applying the method 600 FIG. 6 along with a masked correlation. That is, the signal from A is masked out while finding the shift on B, and similarly the signal of B is masked out while finding the shift on A.

Calculate Line Feed Distance

Figure 13:
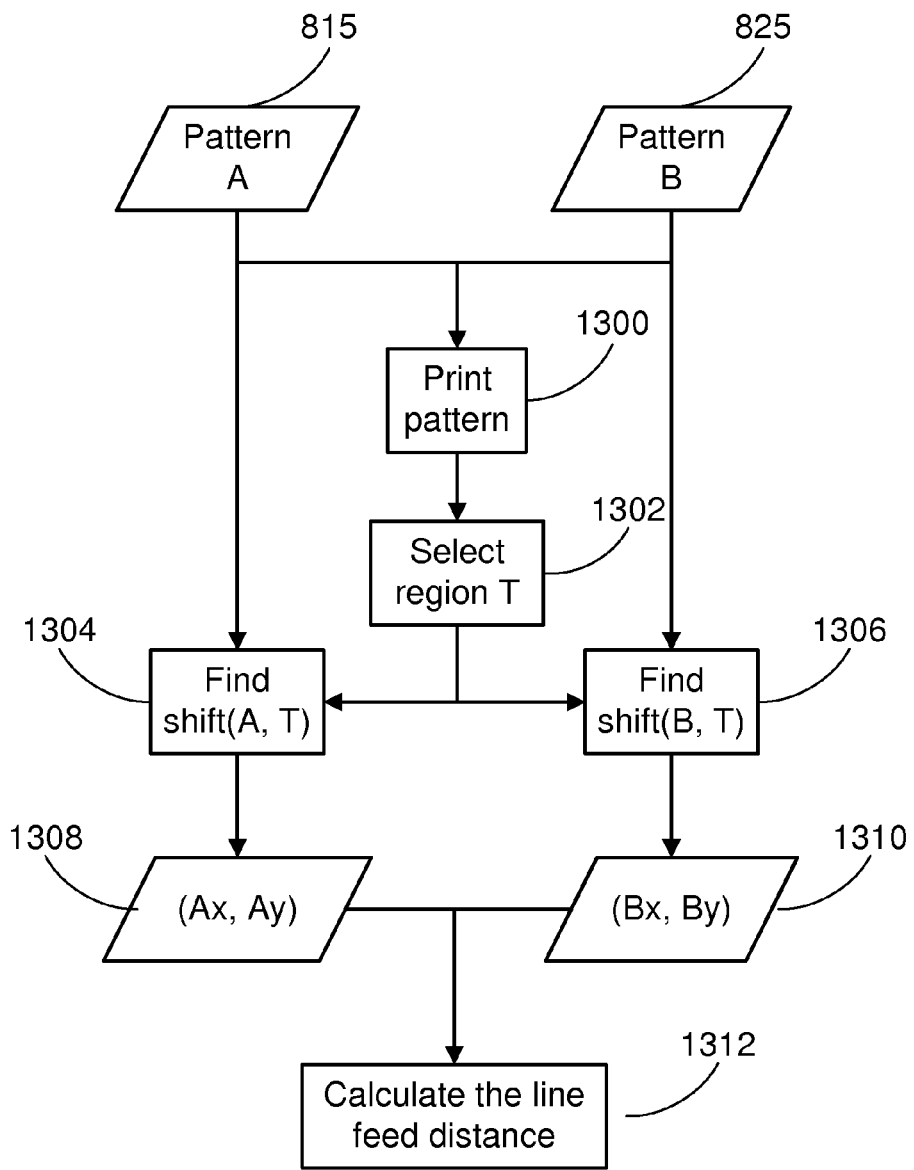
FIG. 13 is a flow diagram illustrating a method of determining printer characteristics in accordance with the first embodiment of the invention.

Referring to FIG. 13, the values of vectors (Ax, Ay) 1308 and (Bx, By) 1310 are used to calculate the line feed distance in step 1312. Let S be a vector that equals (Ax−Bx, Ay−By). Let Proj(S) be a scalar representing the magnitude and the direction of S projected onto the line feed direction 260. The line feed distance is calculated by adding Proj(S) with the dimension of dot pattern A, which is 144/1200 inch in this example.

Second Embodiment

The first embodiment demonstrated a method of measuring line feed distance in which the dot patterns are designed to have dimensions roughly equal to the line feed distance. In situations when the line feed distance is small, accuracy issues may exist if the dot patterns' dimensions are matched to the expected line feed distance.

An alternative arrangement is to design the test chart such that the dimensions of a dot pattern cover multiple line feed distances. For example, if the nominal linefeed is expected to be around 32/1200 of an inch (i.e. 32 dots distance at 1200 dpi), four dot patterns, each with dimensions of 128×128 pixels at 1200 dpi, can be designed. In another example, if the nominal linefeed is 16/1200 of an inch, then 5 dot patterns, each with dimensions of 80×80 pixels, can be used. In general, the larger the tile dimension (up to a limit), the more accurate the measurement is, while extra dot pattern overlap decreases the accuracy. The desired dot pattern dimensions can be determined empirically.

Referring to FIG. 7, the first step 710 of this embodiment is to generate the dot patterns.

Figure 14:
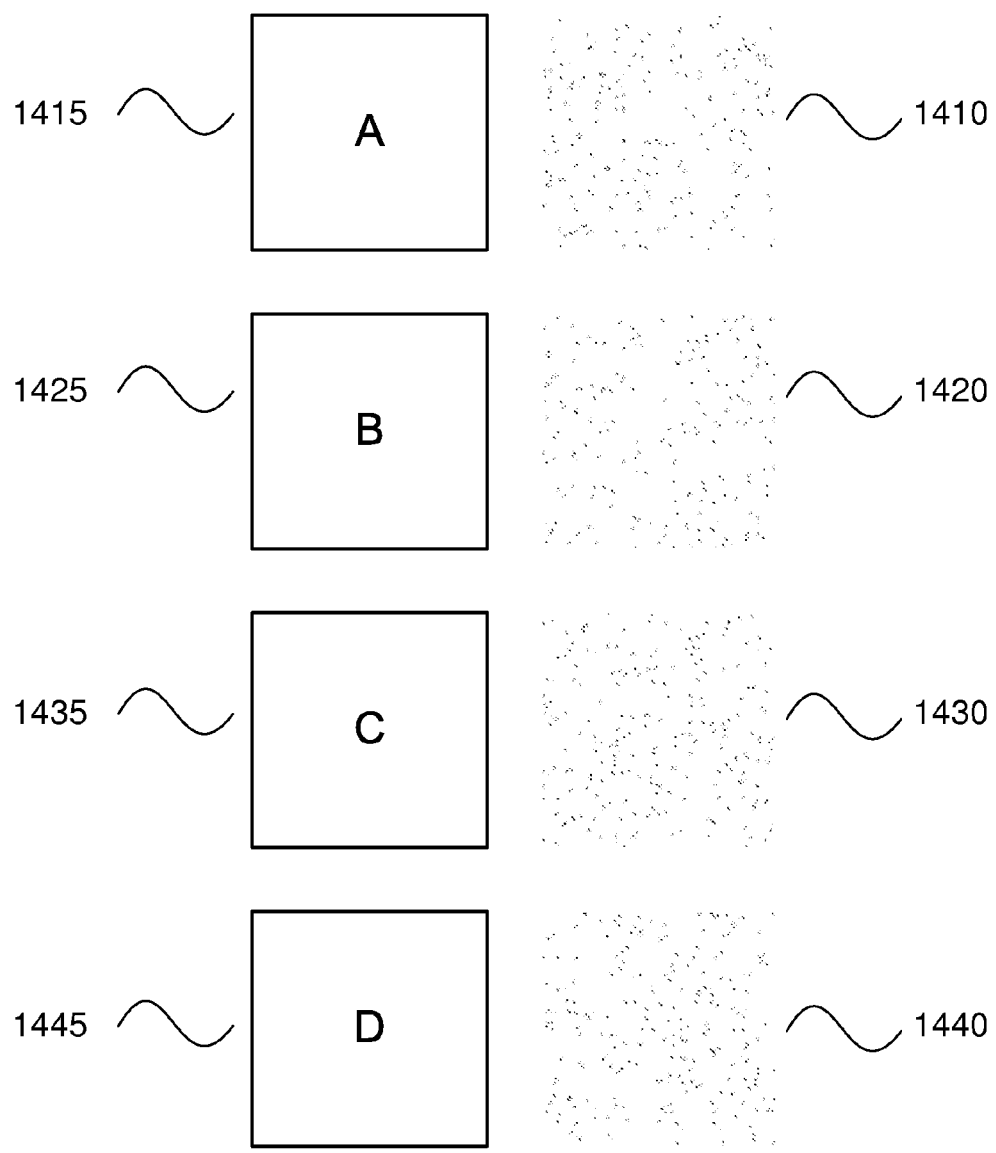
FIG. 14 is a block diagram illustrating some example dot patterns at a resolution of 96×96 pixels.

FIG. 14 illustrates an example of four dot patterns 1410, 1420, 1430, 1440, each with dimensions of 128×128 pixels. The dot patterns 1410, 1420, 1430, and 1440 are generated in the same manner as mentioned above. Because of the random method used to generate the pattern, any two of the generated dot patterns probably have insignificant correlation. If the generated dot patterns have a slight correlation, which occurs rarely, another set of dot patterns can simply be generated.

In this embodiment, the dot density needs to be reduced to around 1.3% because these four dot patterns overlap when printed. For the ease of illustration and understanding, the dot patterns 1410, 1420, 1430, 1440 are depicted with blocks as patterns "A" 1415, "B" 1425, "C" 1435, "D" 1445, respectively. Each of the dot patterns is printed in a different swath.

Referring to FIG. 7, the next step 720 is to print the test chart using the dot patterns 1415 (1410), 1425 (1420), 1435 (1430), and 1445 (1440).

Figure 15:
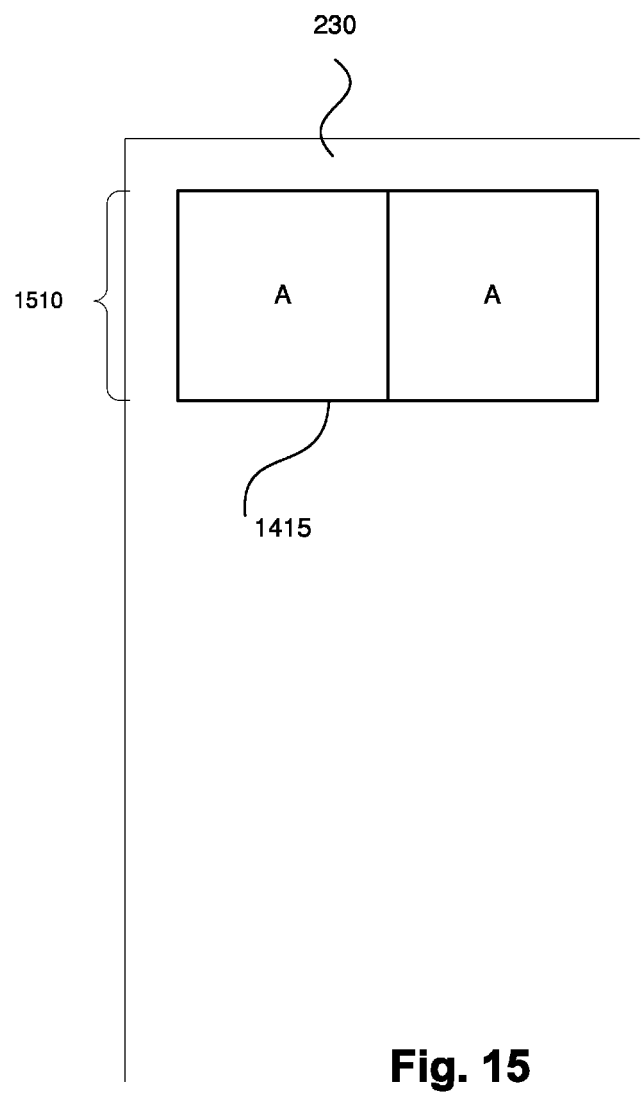
FIG. 15 is a block diagram showing an abstraction of a print medium after one swath of dot patterns A is printed by the inkjet printer in accordance with a second embodiment of the invention.
Figure 16:
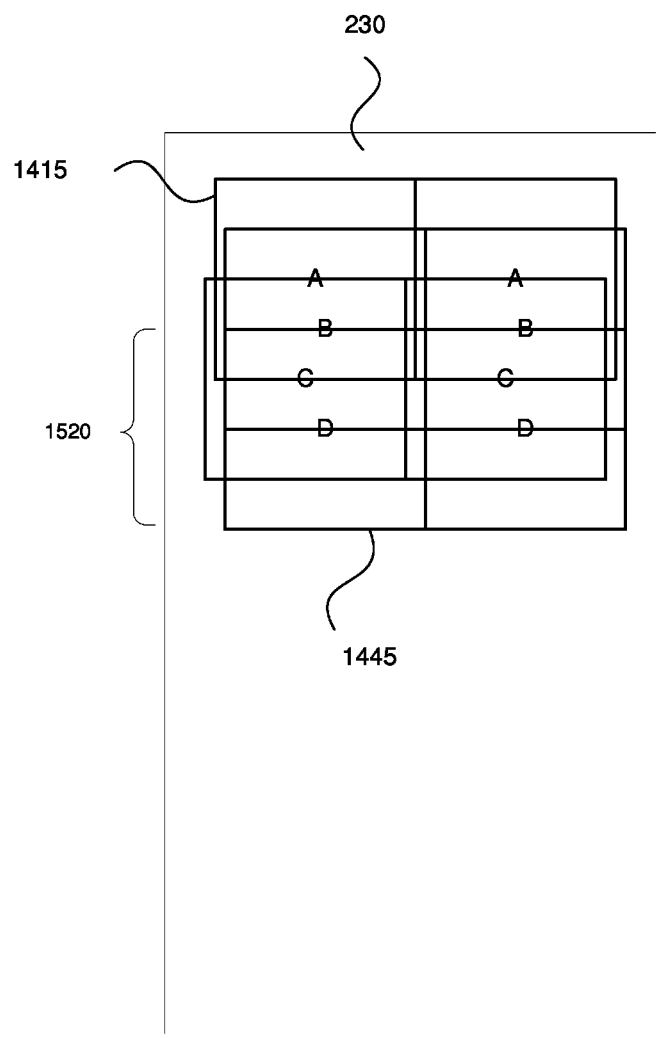
FIG. 16 is a block diagram showing an abstraction of the print medium of FIG. 15 after four swaths are printed by the inkjet printer in accordance with the second embodiment.
Figure 17:
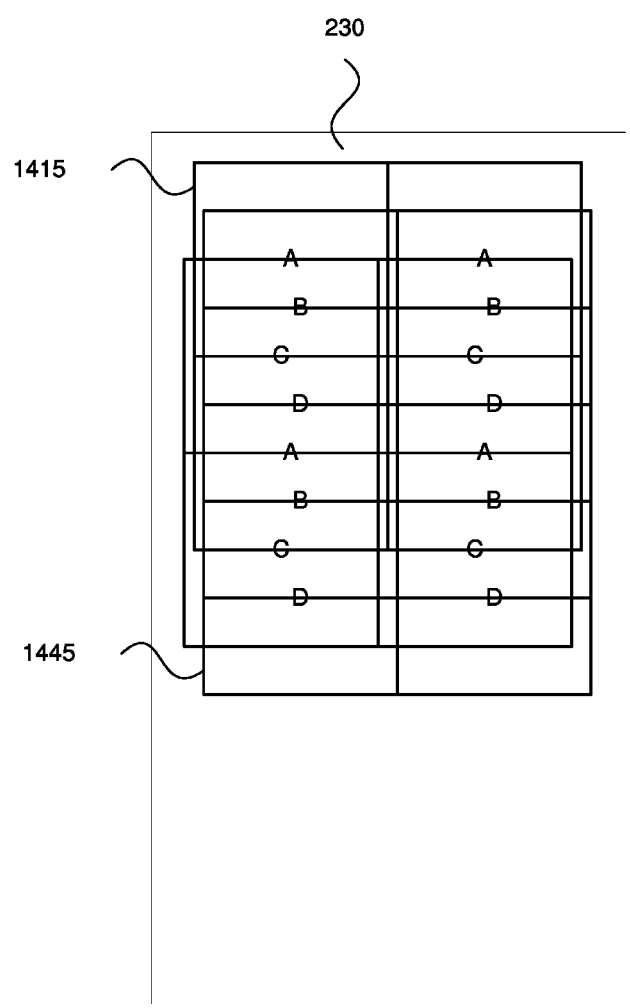
FIG. 17 is a block diagram showing an abstraction of the print medium of FIGS. 15 and 16 after eight swaths are printed in accordance with the second embodiment.

FIG. 15 illustrates an example of a test chart printed on the print medium 230 after the first swath 1510 of the dot patterns 1415. The swath 1510 prints a repetition (only two are illustrated) of the dot pattern A 1415. After a swath is printed, the print medium 230 is expected to be advanced by the line feed distance, for example, 32 dot distances at 1200 dpi, and this embodiment shall measure the actual line feed distance that occurred. The second swath prints a repetition of the dot pattern B 1425. The third swath prints a repetition of the dot pattern C 1435. The fourth swath 1520 prints a repetition of the dot pattern D 1445. The print medium 230 is advanced after each printed swath. FIG. 16 illustrates the test chart after the fourth swath 1520. Each of the swaths are expected to print at the same left margin 1410, but due to mechanical imperfection and also for the ease of illustration, the left margins for each swath shown in FIG. 16 varies. The next four swaths are a repetition of the first four swaths, offset by four linefeeds. FIG. 17 illustrates the test chart after the eighth swath is printed. This printing process repeats for the rest of the test chart.

As illustrated in FIG. 7, after printing 720 the test chart, the test chart is then imaged 730 to form the test image, which is ready to be analysed.

Figure 18:
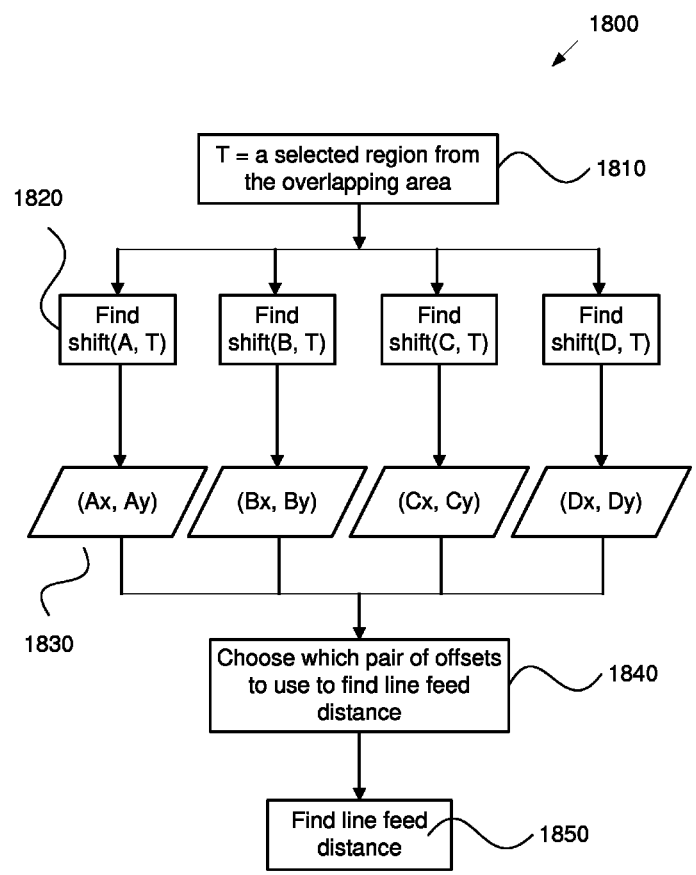
FIG. 18 is a flow diagram illustrating a method of determining printer characteristics in accordance with the second embodiment of the invention.

FIG. 18 illustrates a method 1800 of analysing the test image to calculate the actual line feed distance in this embodiment. The first step 1810 is to select an overlapped region, denoted the selected region T.

Figure 19:
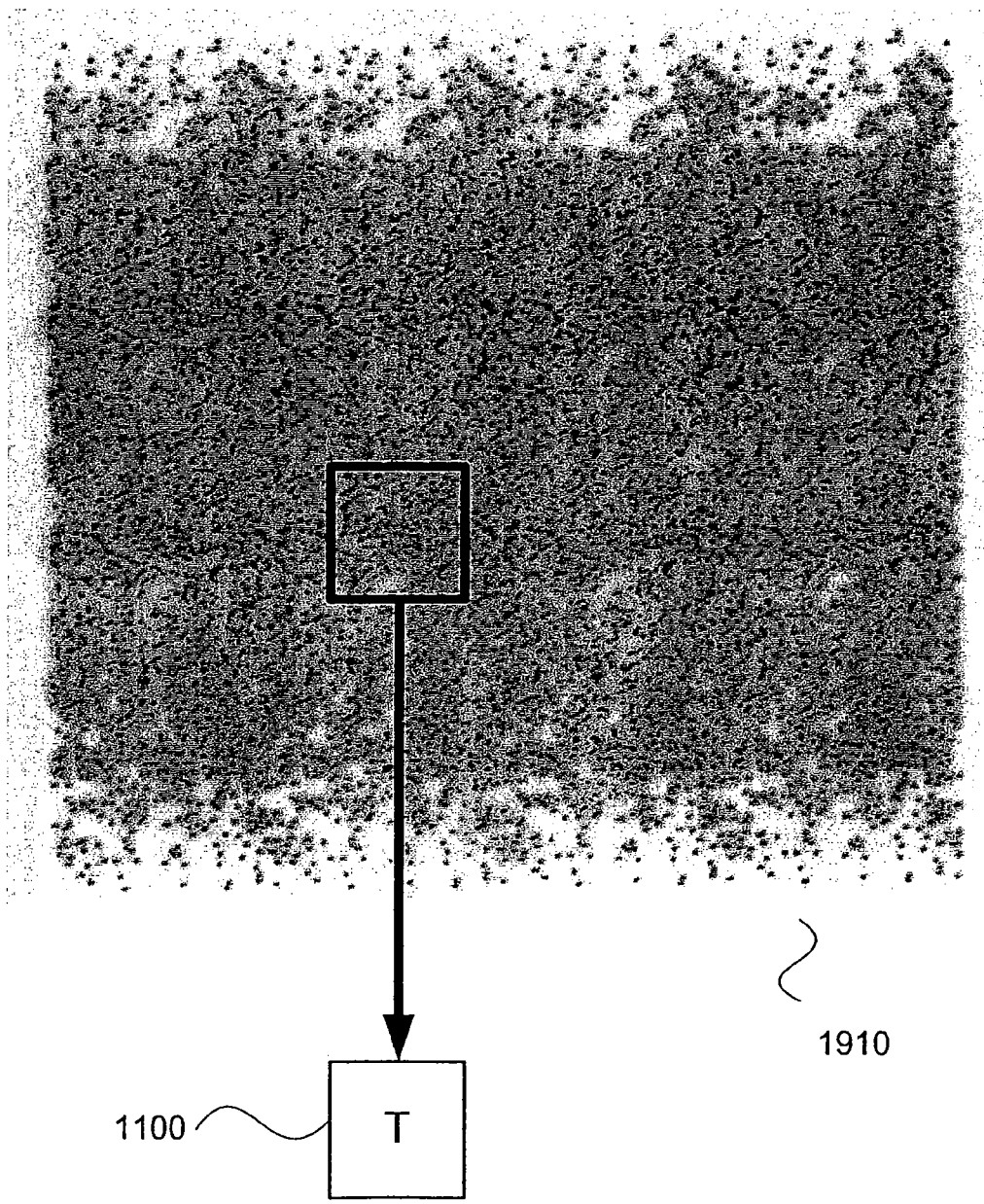
FIG. 19 is an image showing the print medium of FIG. 15 and a selected region T after several swaths have been printed on the print medium in accordance with the second embodiment.

FIG. 19 shows a test image 1910 and a selected region T 1100. The dimension of T must be larger than the expected line feed distance. In this embodiment, the region T 1100 is selected to have the same dimensions as the original four dot patterns. Refer back to FIG. 18, after selecting the region T 1100. Steps 1820 calculate the offset between a representative point in the dot pattern A and the corresponding representative point in T; and likewise for pairs B and T, C and T, and D and T. This is done by the alignment process in FIG. 6. The outputs are the four offset vectors 1830 for each of the shift finding, namely (Ax, Ay), (Bx, By), (Cx, Cy), and (Dx, Dy). The offset vector between two images can be calculated many ways. In this embodiment, phase correlation is used, as described above in FIG. 6.

Referring to process 1840 in FIG. 18, from the four offset vectors 1830, two of the offset vectors 1830 are chosen to calculate the line feed distance. For the best accuracy, the line feed is found by calculating using the two dot patterns that have the most continuous overlapping signal in the T region. In other words, the two dot patterns should have small offset vectors from T in the line feed direction.

Let Proj (A) be a scalar representing the magnitude and the direction of (Ax, Ay) projected onto the line feed direction. Let Proj(B), Proj(C), Proj(D) be similarly defined. Without loss of generality, assuming patterns A and B have the most continuous overlapping signal in the T region, i.e. Proj(A) and Proj(B) have the smallest magnitude, the line feed distance is then calculated using the dot pattern A and dot pattern B. Referring to process 1840 in FIG. 18, let S be a vector equal to (Ax−Bx, Ay−By). The line feed distance is calculated by projecting S on to the line feed direction.

Third Embodiment

The first two embodiments have dealt with making a single measurement in a region, being the length of a single linefeed. In this embodiment, several measurements can be made from the one extracted region.

This embodiment is a general case in which there are three or more overprinted regions, similar to the second embodiment. In relation to FIG. 20, this may occur with a small linefeed, with, for example, the first swath of dot pattern A 1415 being printed from the top of the head, the second swath of dot pattern B 1425 from the middle and the third swath of dot pattern C 1435 from the bottom, so that all three swaths coincide.

Figure 20:
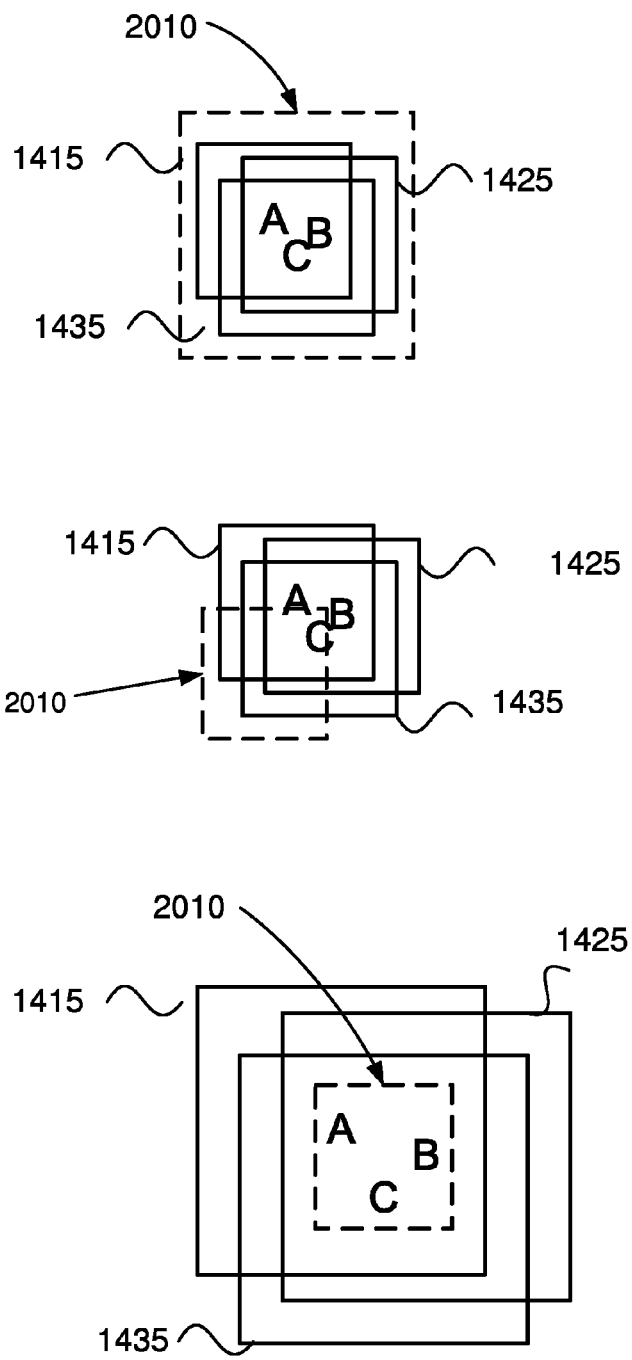
FIG. 20 is a block diagram showing an abstraction of the print medium after swaths of dot patterns A, B, C are printed by the inkjet printer with various acceptable analysis regions in accordance with of a third embodiment of the invention.

A digital image of this chart is produced using the system shown in FIG. 5. The printed test chart is placed on the scanner 119 and scanned to the hard drive of computer 520 to form a test image. From this test image, a region 2010 is extracted for analysis. This extracted region must contain at least a significant portion of all three dot patterns. FIG. 20 shows three examples of acceptable regions 2010.

Similar to the previous embodiments, the region 2010 is analysed to find the offset between any representative point in A and the corresponding representative point in T; likewise between B and T and between C and T. Let Proj (A) be a scalar representing the magnitude and the direction of (Ax, Ay) projected onto the line feed direction. Let Proj(B) and Proj(C) be similarly defined. Then these results can be combine to find (Ax−Bx, Ay−By), (Ax−Cx, Ay−Cy) or (Cx−Bx, Cy−By).

Fourth Embodiment

The second embodiment demonstrated a method of measuring line feed distances much shorter than the dimension of the four (for example) dot patterns. Any pair of dot patterns is expected to have insignificant correlation.

An alternative arrangement is to use only one dot pattern to print the test chart and calculate the line feed by determining multiple representative points in the correlation.

Referring to FIG. 7, the first step 710 of this embodiment is to generate a dot pattern. For example, if the line feed to measure is expected to be around 32/1200 of an inch (i.e. 32 dots distance at 1200 dpi). The dot pattern can have the dimensions 128×128 pixels at 1200 dpi.

Figure 21:
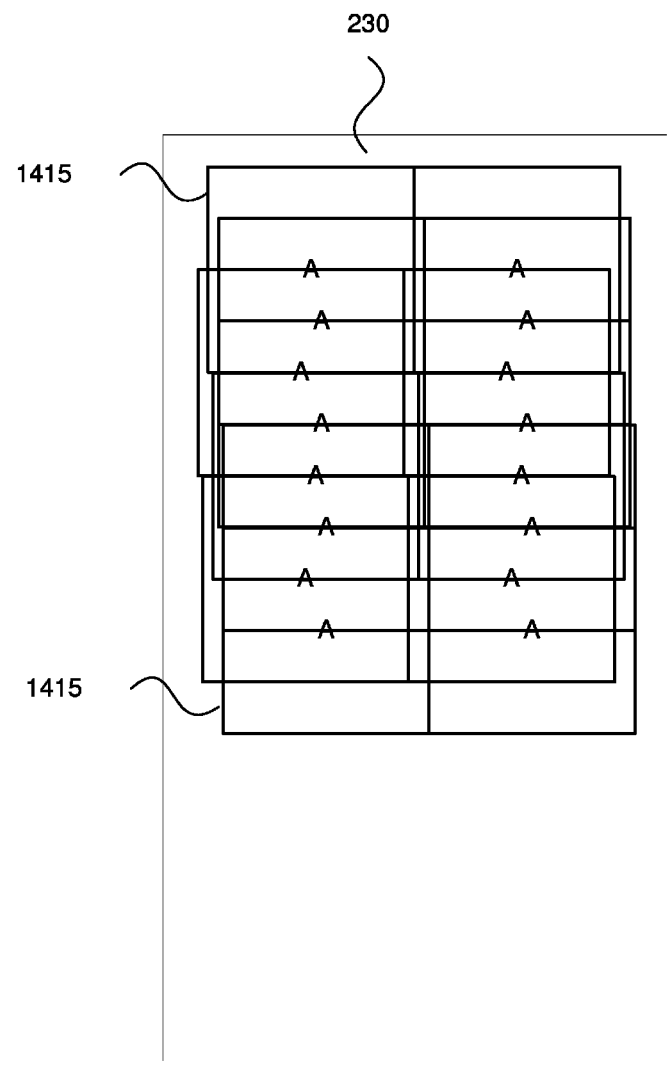
FIG. 21 is a block diagram illustrating an abstraction of the print medium after several swaths of dot pattern A are printed by the inkjet printer in accordance with a fourth embodiment of the invention.

Referring to FIG. 14, let the dot pattern 1410, labelled pattern A 1415, be the dot pattern used to print the test chart. FIG. 15 illustrates an example of a test chart printed on the print medium 230 after the first swath 1510. The swath 1510 prints a repetition (only two are illustrated) of dot pattern A 1415. After a swath 1510 is printed, the print medium 230 is then expected to be advanced by the line feed distance, for example, 32 dot distances at 1200 dpi, and this embodiment measures the actual line feed distance. The second and the rest of the swaths are printed in the same manner as the first swath. FIG. 21 illustrates the test chart after eighth swath of pattern A 1415 is printed.

Figure 22:
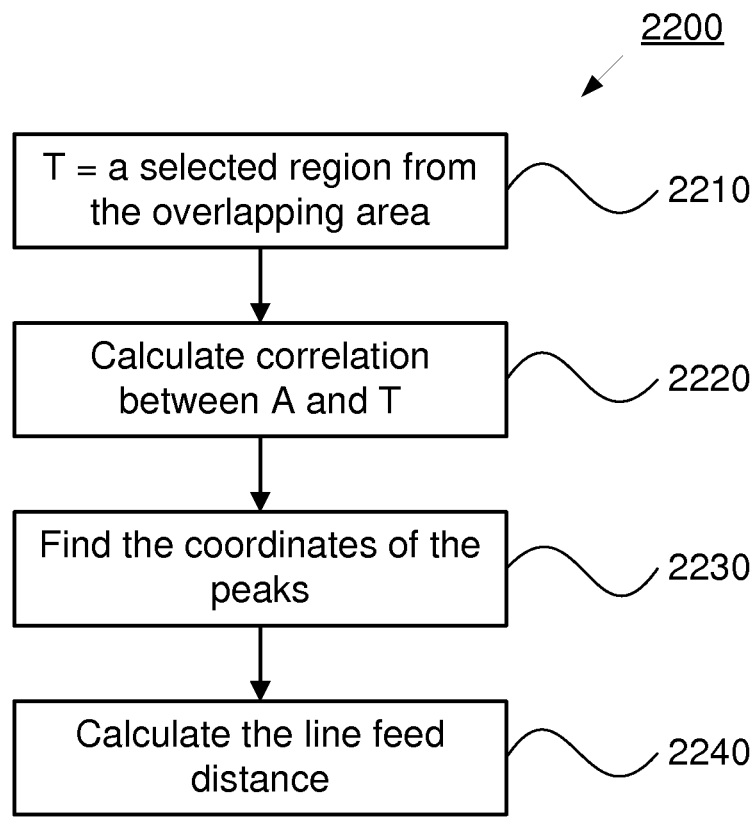
FIG. 22 is a flow diagram of a method of determining printer characteristics in accordance with the fourth embodiment of the invention.

As illustrated in FIG. 7, after printing 720 the test chart, the test chart is imaged 730 using the system in FIG. 5 and is ready for analysis. FIG. 22 illustrates a method 2200 to analyse the imaged test chart in this embodiment and calculate the line feed distance. The first step 2210 is to select a region from the overlapping area in the scanned image of the printed test chart, denoted the selected region "T" 1100. The dimension of the region T must be larger than the expected line feed distance. In this embodiment, the region T is selected 2210 to have the same dimension as the dot pattern, A. Referring to FIG. 22, after selecting the region T, the next step 2220 is to calculate the correlation between the pattern A and the selected region T. This is done using the steps 601 to 611 in FIG. 6. The output of steps 601 to 611 is a correlation amplitude image 611 between the dot pattern A and the selected region T of the image of the printed test pattern.

In this example, because T has dimension of 128×128 pixel at 1200 dpi and the line feed distance is supposed to be 32/1200 inch, the signal of the dot pattern A should have appeared in the selected region T in four different positions (128/32=4). This means, there should be four positions in the correlation amplitude image 611 that have distinctively high amplitudes, also known as peaks. In addition, the four peaks are expected to be roughly 32 pixels apart.

Referring to FIG. 22, step 2230 finds the coordinates of the (four) peaks. The coordinate of the largest absolute amplitude value in the correlation amplitude image 611 gives the coarse coordinates of the first peak position. The coordinate of the second largest absolute amplitude value in the correlation amplitude image 611, where the coordinate is not within 5 pixels to the first coarse peak position, gives the coarse coordinates of the second peak position. The positions of the third peak and the fourth peak are also found in a similar manner. The coarse coordinates are refined by the steps 613, 614, 615 and 616 of FIG. 6. These refined coordinates give the offset between any representative point in each of the instances of the dot pattern A, and the corresponding representative point in the region T.

Referring to FIG. 22, step 2240 calculates the linefeed distances from the representative points. The positions of the four peaks are first sorted in ascending order on the line feed direction. Let (x1, y1), (x2, y2), (x3, y3) and (x4, y4) denote the (x, y) coordinates of the sorted peaks.

Let Proj(x, y) be a scalar representing the magnitude and the direction of (x, y) projected onto the line feed direction. The $k^{th}$ line feed distance is calculated by Proj(x2−x1, y2−y1). The $k+1^{th}$ line feed distance is calculated by Proj(x3−x2, y3−y2). The $k+2^{th}$ line feed distance is calculated by Proj(x4−x3, y4−y3). The value of k depends on the where the region T is selected.

Fifth Embodiment

The first and second embodiments are designed to measure small to moderate line feeds as compared to the print head 210, but in the case of a line feed which is larger than half the head width, another approach is needed. This is the scenario that the fifth embodiment addresses. The line feed is required to be smaller than the print head by at least a lower limit empirically determined based on the resolutions of the printer and the quality of the scanner 119.

Referring to FIG. 7, the first step 710 of this embodiment is to generate the dot patterns. In this embodiment, the dot patterns are designed to be the difference in size between the head size and the nominal line feed distance. So, for example, if the head size is 512/1200 of an inch (512 pixels at 1200 dpi) and the desired line feed distance is 288/1200 of an inch (288 pixels distance at 1200 dpi), the dot patterns are designed to be 224 pixels wide and high.

Figure 23:
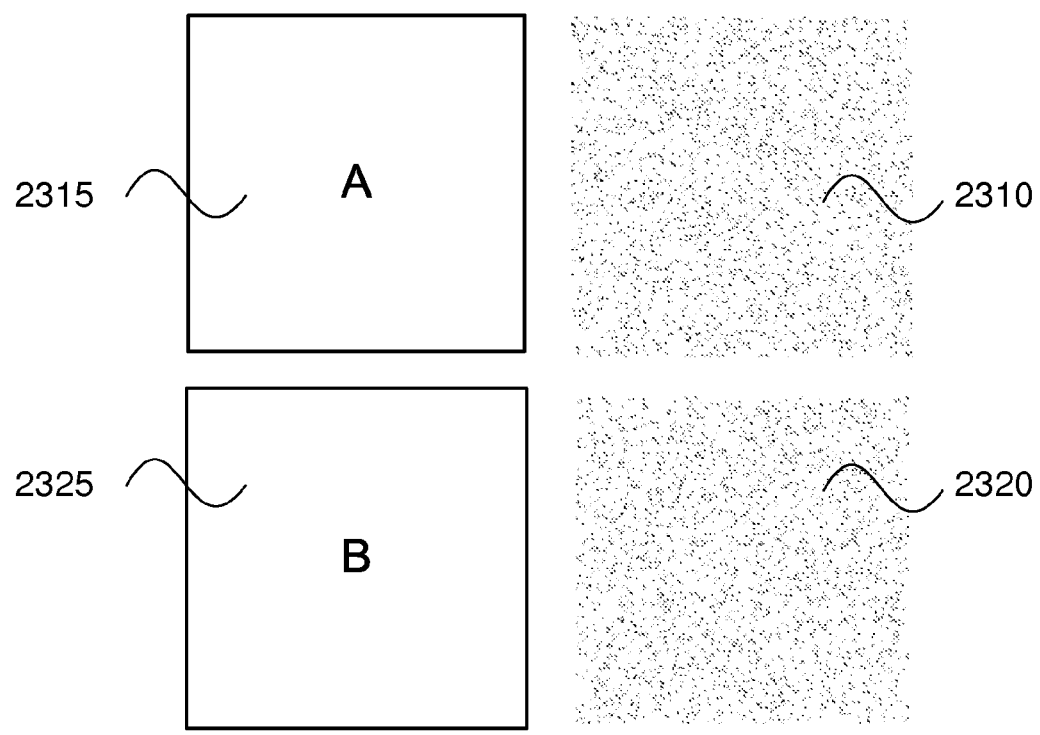
FIG. 23 is a block diagram of example dot patterns A and B at a resolution of 224×224 pixels.

Example dot patterns are displayed in FIG. 23 as 2310 and 2320, each being 224 pixels wide and high. The pattern design process is described in the first embodiment. For the ease of illustration and understanding, the dot patterns 2310, 2320, shall be depicted as patterns "A", "B" 2315, 2325, respectively.

Figure 24:
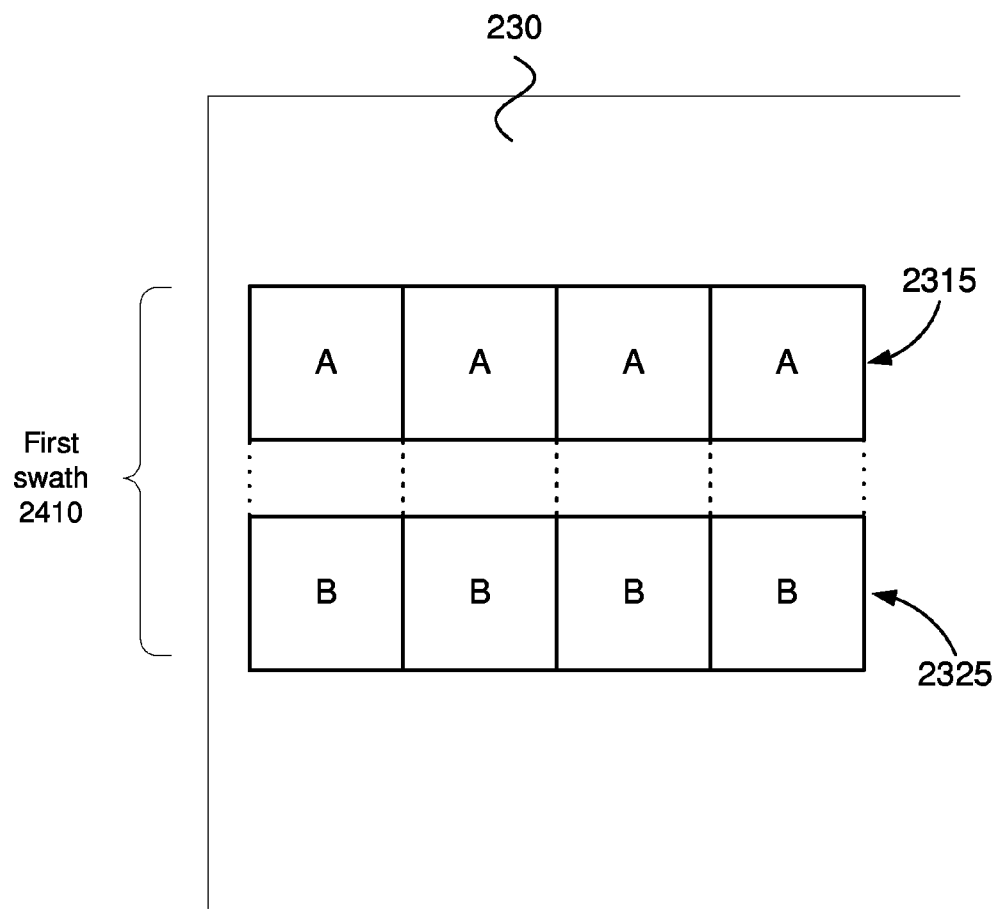
FIG. 24 is a block diagram showing an abstraction of a print medium after one swath of dot patterns A and B are printed by an inkjet printer in accordance with a fifth embodiment of the invention.

Since the line feed is more than half of the width of the print head, a single dot pattern is necessarily less than half of the width of the print head, and therefore two patterns can be printed across the same swath. Without loss of generality, assume the pattern 2315 is aligned to the top of the print head and the pattern 2325 is aligned to the bottom of the print head, as shown in FIG. 24. There is likely a gap between the two patterns 2315, 2325 as shown. This pair of patterns can be repeated across the medium 230 to the width of the test chart.

After a swath 2410 is printed, the print medium 230 is then expected to be advanced by the line feed distance, for example, 288 dot distances at 1200 dpi, and this embodiment measures the actual line feed distance that occurred.

Figure 25:
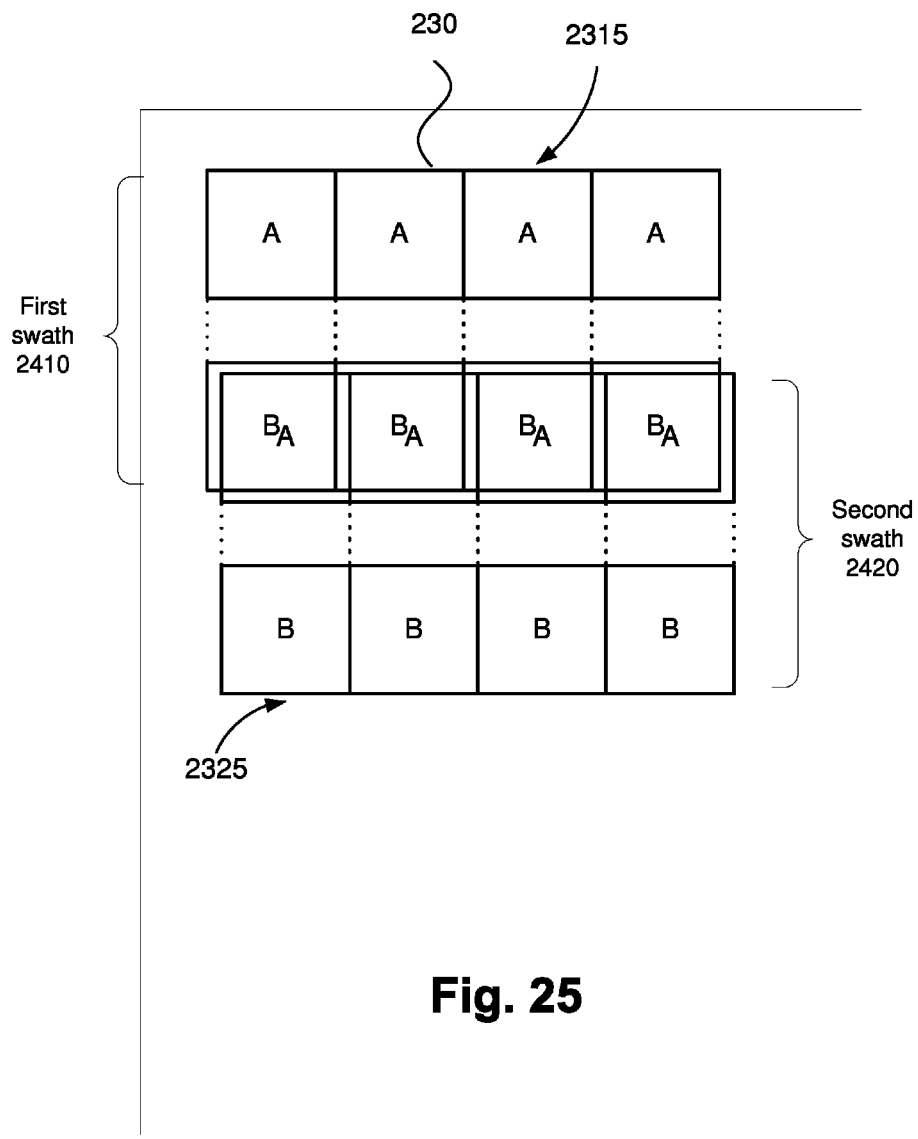
FIG. 25 is a block diagram showing an abstraction of the print medium of FIG. 24 after two swaths are printed in accordance with the fifth embodiment.
Figure 26:
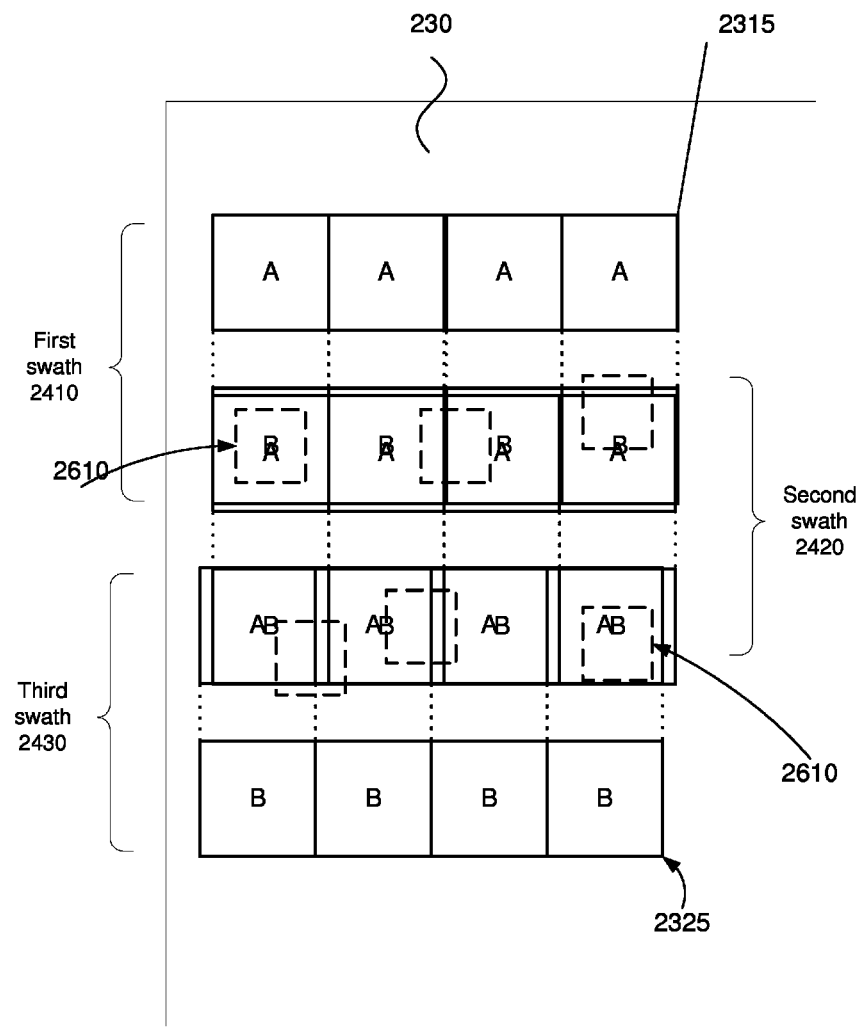
FIG. 26 is a block diagram showing an abstraction of the print medium after three swaths of dot patterns A and B are printed by the inkjet printer in accordance with the fifth embodiment of the invention.

FIG. 25 illustrates the same test chart after the second swath 2420 is printed on top of the first swath 2410. The printing process carries on and FIG. 26 illustrates the same test chart after 3 swaths 2410, 2420, and 2430 are printed.

As illustrated in FIG. 7, after printing 720 the test chart, the test chart is imaged 730 using the system in FIG. 5 and is ready for analysis. In this embodiment, as distinct from the first embodiment, care must be taken in selection of the region to analyse, to ensure that the selected region T contains a significant proportion of the patterns 2315 and 2325. Six examples of the region T 2610 are shown in FIG. 26.

The selected region T 2610 is then analysed following the method in FIG. 13, as described in the first embodiment, and Proj(S) is calculated as described in the first embodiment.

The line feed distance is Proj(S) plus the starting position of the dot pattern B, which is 288/1200 inch in this example.

Sixth Embodiment

The previous embodiments are designed to measure various line feed distances in a printer. However, any physical characteristic of a printer that can be represented as a displacement can be measured. In particular, this embodiment can be used to measure the alignment of different colour nozzle banks, or the horizontal alignment of bidirectional printing.

Since line feed is not being measured, the size of the dot patterns is entirely unconstrained. As such, the size that provides the best performance in terms of accuracy can be empirically determined based on the resolutions of the printer 115 and the quality of the scanner 119.

Figure 27:
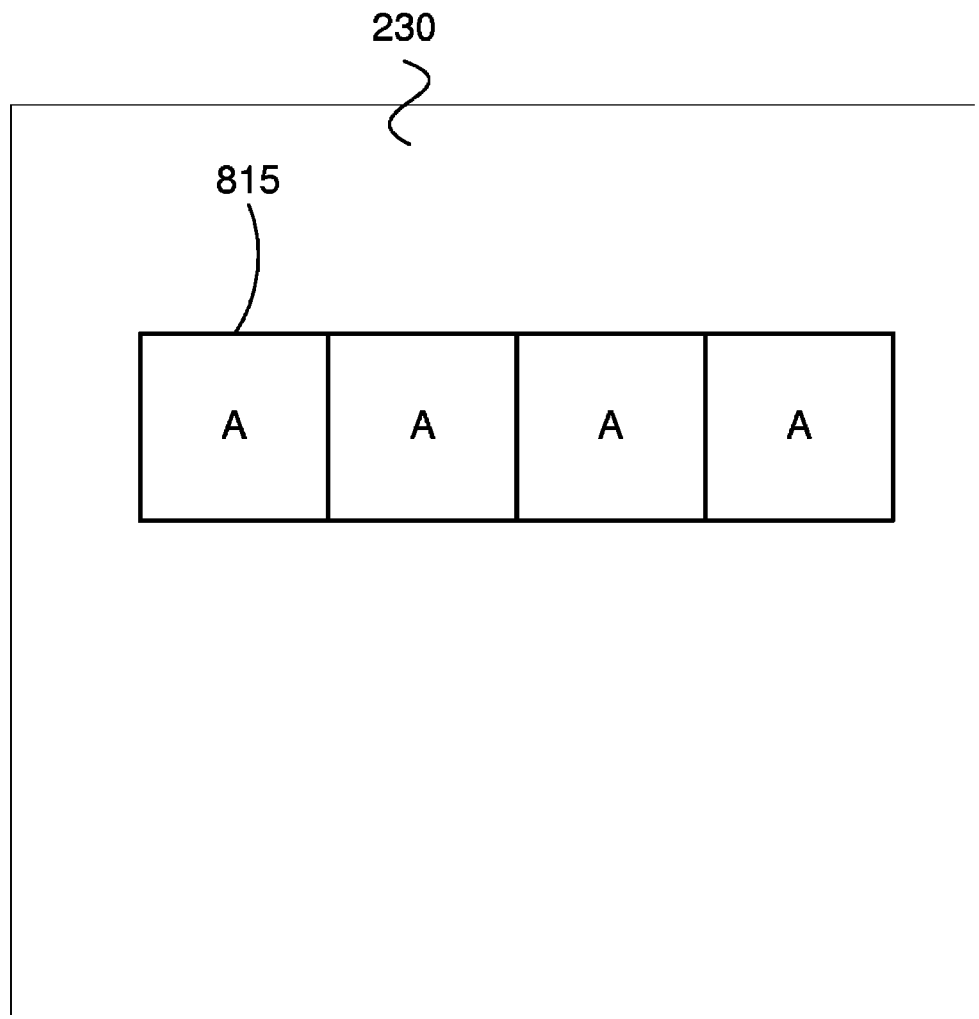
FIG. 27 is a block diagram showing an abstraction of a print medium after one swath of dot patterns A are printed by an inkjet printer in accordance with a sixth embodiment of the invention.

In this embodiment, a dot pattern measuring 144×144 pixels at 1200 dpi is used as an example. As shown in FIG. 27, a dot pattern 815 is printed on the print medium 230 and repeated to the width of the chart. In the case of bidirectional printing, the second dot pattern 825 is overlayed in the reverse pass of the printing head 210 as shown in FIG. 27. To measure alignment of two different nozzle banks, for example the alignment of two different colours, the two different patterns are printed from different coloured nozzles with no intervening line feed. The colour information can be used to distinguish the patterns, but due to misalignment of the colour channels in the scanner 119, a single appropriate channel can be chosen advantageously in which the colours being aligned are prominent.

Figure 28:
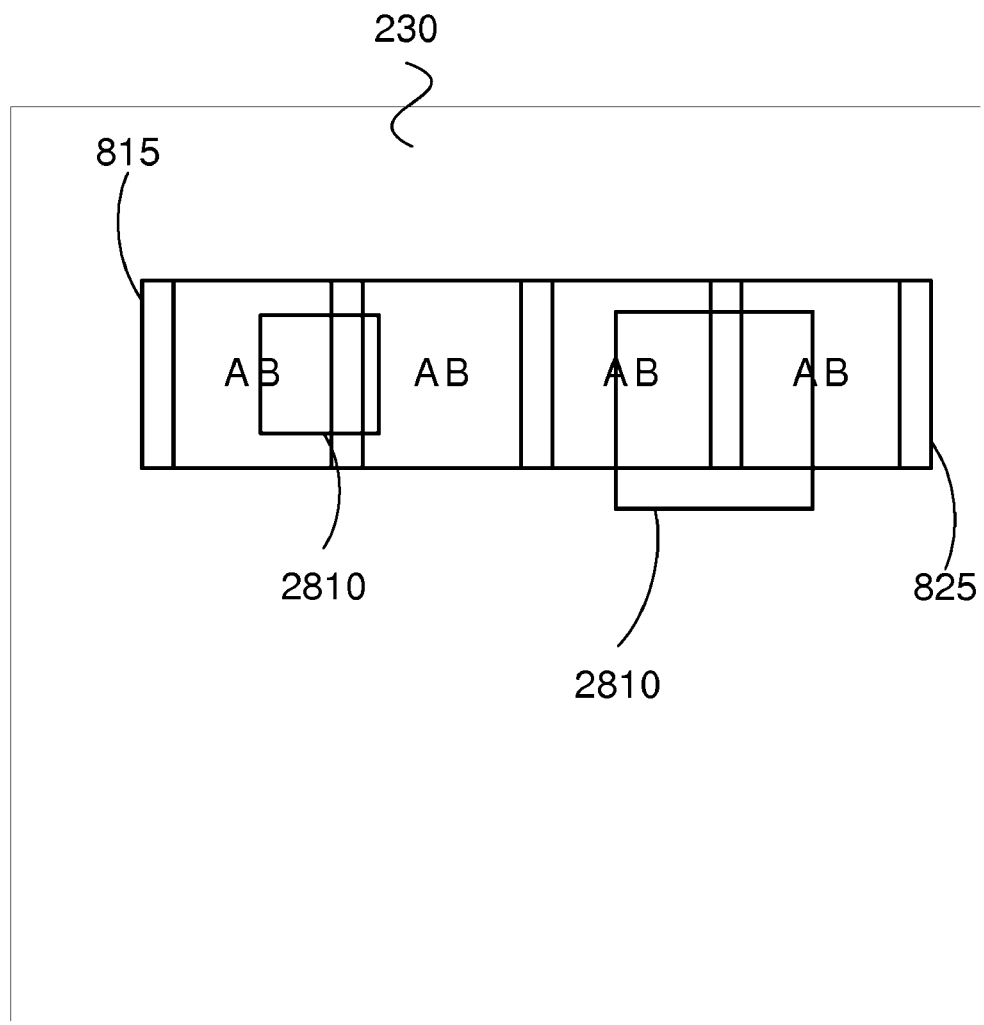
FIG. 28 is a block diagram showing an abstraction of the print medium after two swaths of dot patterns A and B are printed by the inkjet printer in accordance with the sixth embodiment.

Referring to FIG. 7, after printing 720 and imaging 730 the test chart, the next step 740 is to select a region, T, for analysis. Similar to the previous embodiments, the selected region T must contain significant portion of signals from both of the dot patterns. Two examples of the region T 2810 are illustrated in FIG. 28.

Referring again to FIG. 7, the next step 750 is to analyse the selected region T. This process is nearly identical to the first embodiment. Referring to FIG. 13, the next step of analysing the selected region T is to find 1304 the shift between pattern A and region T, the result of which is denoted by a vector (Ax, Ay) 1308 and denotes the offset between any representative point in A and the corresponding representative point in T. Also, the shift between B and T 1306 is analysed, the result of which is denoted by a vector (Bx, By) 1310 and denotes the offset between any representative point in B and the corresponding representative point in T. The process of shift finding is identical to the first embodiment.

The value of (Ax, Ay) 1308 and (Bx, By) 1310 is used to calculate the line feed distance. Let S be a vector equal to (Ax−Bx, Ay−By). Let Proj(S) be a scalar representing the magnitude and the direction of S projected onto the swath direction 240.

Proj(S) is the measurement for the horizontal alignment.

Methods, apparatuses, systems, and computer program products for measuring spatial characteristics of an inkjet printer are disclosed. The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A computer-implemented method of measuring spatial characteristics of an inkjet printer, said method comprising the steps of:
   printing groups of marks in accordance with a first predetermined pattern on a print medium using a first group of nozzles of a print mechanism of the printer to form a first printed pattern;
   printing groups of marks in accordance with a second predetermined pattern on the print medium using a second group of nozzles of the print mechanism of the printer to form a second printed pattern, wherein the printed groups of marks in the first printed pattern and second printed pattern form a test chart and a region of overlap of the printed groups of marks in accordance with the first and second printed patterns are formed on the print medium;
   imaging at least a portion of the printed test chart having the groups of marks printed thereon to form an image of the printed test chart;
   selecting from the image of the printed test chart in the region of overlap a first group of marks from the first printed pattern and a second group of marks from the second printed pattern;
   for each of the first and second groups of marks, determining a position representative of that group printed on the print medium; and
   determining an offset for measuring spatial characteristics of the printer between the first and second printed patterns dependent upon the representative position of each of the first and second groups of marks, wherein the offset is a displacement between patterns in the test chart and the image of the printed test chart.

2. The method as claimed in claim 1, wherein the first predetermined pattern is printed in plural and the first predetermined patterns are identical or substantially identical.

3. The method as claimed in claim 1, wherein:
   the first predetermined pattern is printed on the print medium before a line feed of the print medium by the printer; and
   the second predetermined pattern is printed on the print medium after the line feed of the print medium by the printer.

4. The method as claimed in claim 1, wherein the first predetermined pattern and the second predetermined pattern are printed on the print medium by different color nozzle banks of the printer.

5. The method as claimed in claim 1, wherein the first predetermined pattern and the second predetermined pattern are printed on the print medium by different swath directions of the printer.

6. The method as claimed in claim 1, wherein the first predetermined pattern, or the second predetermined pattern, or both, is a spread spectrum pattern.

7. The method as claimed in claim 1, wherein the imaging has a low imaging resolution.

8. The method as claimed in claim 1, wherein the first group of marks is distinguishable from the second group of marks independently of the identification of any one mark.

9. The method according to claim 1, further comprising the step of measuring the spatial characteristics of the printer.

10. The method according to claim 1, further comprising the steps of:
aligning the test chart and the image of the printed test chart; and
extracting a region of the test chart from the aligned scanned image.

11. The method according to claim 10, further comprising the step of measuring the spatial characteristics of the printer.

12. The method according to claim 11, wherein the spatial characteristics of the printer comprise a line feed distance, the line feed distance dependent upon a shift between the groups of marks of the first predetermined pattern in the test chart and the groups of marks of the first predetermined pattern in a selected region of the image of the printed test chart and upon a shift between the groups of marks of the second predetermined pattern in the test chart and the groups of marks of the second predetermined pattern in a selected region of the image of the printed test chart, the selected region being in the region of overlap.

13. The method according to claim 11, wherein the spatial characteristics of the printer comprise the alignment of different color nozzle banks of the printer.

14. The method according to claim 11, wherein the spatial characteristics of the printer comprise the horizontal alignment of bidirectional printing.

15. The method according to claim 1, wherein more than two groups of marks are printed and imaged.

16. A system for measuring spatial characteristics of an inkjet printer, said system comprising:
an inkjet printer for printing a test chart;
an imaging device for imaging the printed test chart;
an interface coupled to said inkjet printer and said imaging device;
a memory for storing data and a computer program; and
a processor unit coupled to said memory and said interface for executing the computer program, said memory and said processor unit configured to measure the spatial characteristics of said inkjet printer, the computer program comprising:
computer program code means for printing groups of marks in accordance with a first predetermined pattern on a print medium using a first group of nozzles of a print mechanism of said printer to form a first printed pattern;
computer program code means for printing groups of marks in accordance with a second predetermined pattern on the print medium using a second group of nozzles of the print mechanism of said printer to form a second printed pattern, wherein the printed groups of marks in the first printed pattern and second printed pattern form a test chart and a region of overlap of the printed groups of marks in accordance with the first and second printed patterns are formed on the print medium;
computer program code means for imaging at least a portion of the printed test chart having the groups of marks printed thereon to form an image of the printed test chart;
computer program code means for selecting from the image of the printed test chart in the region of overlap a first group of marks from the first printed pattern and a second group of marks from the second printed pattern;
computer program code means for, for each of the first and second groups of marks, determining a position representative of that group printed on the print medium; and
computer program code means for determining an offset for measuring spatial characteristics of said printer between the first and second printed patterns dependent upon the representative position of each of the first and second groups of marks, wherein the offset is a displacement between patterns in the test chart and the image of the printed test chart.

17. A computer program product comprising a non-transitory computer readable medium having a computer program recorded therein for execution by a computer system to measure spatial characteristics of an inkjet printer, said computer program comprising:
computer program code means for printing groups of marks in accordance with a first predetermined pattern on a print medium using a first group of nozzles of a print mechanism of the printer to form a first printed pattern;
computer program code means for printing groups of marks in accordance with a second predetermined pattern on the print medium using a second group of nozzles of the print mechanism of the printer to form a second printed pattern, wherein the printed groups of marks in the first printed pattern and second printed pattern form a test chart and a region of overlap of the printed groups of marks in accordance with the first and second printed patterns are formed on the print medium;
computer program code means for imaging at least a portion of the printed test chart having the groups of marks printed thereon to form an image of the printed test chart;
computer program code means for selecting from the image of the printed test chart in the region of overlap a first group of marks from the first printed pattern and a second group of marks from the second printed pattern;
computer program code means for, for each of the first and second groups of marks, determining a position representative of that group printed on the print medium; and
computer program code means for determining an offset for measuring the spatial characteristics of the printer between the first and second printed patterns dependent upon the representative position of each of the first and second groups of marks, wherein the offset is a displacement between patterns in the test chart and the image of the printed test chart.

\* \* \* \* \*